United States Patent [19]
Minagawa

[11] Patent Number: 5,214,829
[45] Date of Patent: Jun. 1, 1993

[54] CARRIAGE STRUCTURE OF NC LATHE

[75] Inventor: Seigo Minagawa, Osaka, Japan

[73] Assignee: Dainichi Kinzoku Kogyo Kabushiki Kaisha, Osaka, Japan

[21] Appl. No.: 845,187

[22] Filed: Mar. 2, 1992

[30] Foreign Application Priority Data

Mar. 11, 1991 [JP] Japan .................................. 3-104890

[51] Int. Cl.$^5$ ............................................. B23P 23/02
[52] U.S. Cl. ..................................... 29/27 C; 29/27 R; 82/121
[58] Field of Search ................... 29/27 A, 27 B, 27 C; 82/120, 121

[56] References Cited

U.S. PATENT DOCUMENTS

| | | | |
|---|---|---|---|
| 4,571,796 | 2/1986 | Sellner et al. | 29/27 R |
| 4,719,676 | 1/1988 | Sansone | 29/27 A |
| 4,777,713 | 10/1988 | Kitamura | 29/27 C |
| 4,785,525 | 11/1988 | Ishida et al. | 29/27 R X |
| 5,020,201 | 6/1991 | Kitamura | 29/27 C |
| 5,052,089 | 10/1991 | Gadaud et al. | 29/27 R |

FOREIGN PATENT DOCUMENTS

| | | | |
|---|---|---|---|
| 3706882 | 9/1988 | Fed. Rep. of Germany | 29/27 R |
| 234101 | 9/1989 | Japan | 29/27 R |
| 8806943 | 9/1988 | World Int. Prop. O. | 29/27 R |
| 8911374 | 11/1989 | World Int. Prop. O. | 29/27 R |

Primary Examiner—William Briggs
Attorney, Agent, or Firm—Thomas J. Dodd

[57] ABSTRACT

An NC lathe includes a bed, a headstock mounted on the bed for rotating a work around C-axis, a tailstock slidably mounted on a first guide surface formed on the bed, and a carriage slidably mounted on a second guide surface formed on the bed in a direction of Z-axis parallel to the C-axis and juxtaposed with the first guide surface. The carriage has a saddle having a first slide surface for contacting the second guide surface of the bed and a second slide surface inclined at a predetermined angle with respect to the first slide surface. A slide base is slidably mounted on the second slide surface of the saddle for movement in a direction of Y-axis perpendicular to the Z-axis. A column extends from the slide base substantially perpendicular thereto and includes a column body which has a guide surface in a direction of X-axis perpendicular to the Z-axis and to the Y-axis. A cross slide is slidably mounted on the guide surface of the column body in the direction of the X-axis and includes a driving device. A tool spindle is rotatably mounted on the cross slide around B-axis perpendicular to the X-axis and to the Z axis and has a spindle rotatable around an axis perpendicular to the B-axis.

4 Claims, 20 Drawing Sheets

1

CARRIAGE STRUCTURE OF NC LATHE

BACKGROUND OF THE INVENTION

1. Field of the Invention

The present invention relates to a carriage structure of an NC lathe.

2. Description of the Prior Art

In a conventional NC lathe for machining a work W to form a shape as shown in FIGS. 31 to 33, an initial set-up step including an operation for chucking the work W and a subsequent operation for centering the work W by a tailstock and bracing means. A first matching step is thereafter performed and includes a turning operation for an outer surface of the work W to form a stepped portion 1 having surfaces 1a, 1b and 1c, another turning operation to form an inner surface 2 and an operation for threading the surface 1a to form a thread 3.

A second machining step is subsequently performed to form a flange portion 4 and its end portion 5. Before performing the second machining step, the work W machined through the first machining step if removed from a chuck of the NC lathe and is thereafter again mounted on the chuck at an inverted position. The work W thus mounted on the chuck is centered for the second machining step.

The work W machined through the second machining step is transferred to a vertical machining center at which the work W is again centered for a third machining step to form a key recess 6 and to machine first flat surfaces 7 and second flat surfaces 8 through indexing operations. The work W machined through the third machining step is thereafter transferred to a horizontal machining center at which the work is again centered for a fourth machining step to finally form holes 9 on the end portion 5 through a drill-tapping operation.

The above conventional machining steps, however, consumes much time for transferring the work W for each subsequent machining step and also consumes much time for centering the work W at each subsequent machining step. Further, this may degrade the quality of the work W and cause problems in introduction of automatic operation.

SUMMARY OF THE INVENTION

It is, accordingly, an object of the present invention to provide a carriage construction of an NC lathe which may permit turning, milling, drilling, boring, threading and reaming operations without frequently removing a work once the work has been mounted.

According to the present invention, there is provided a carriage structure of an NC lathe comprising a bed, a headstock mounted on the bed for rotating a work around C-axis, a tailstock slidably mounted on a first guide surface formed on the bed, and a carriage slidably mounted on a second guide surface formed on the bed in a direction of Z-axis parallel to the C-axis and juxtaposed with the first guide surface, the carriage including:

a saddle having a first slide surface for contacting the second guide surface of the bed and a second slide surface inclined at a predetermined angle with respect to the first slide surface;

a slide base slidably mounted on the second slide surface of the saddle for movement in a direction of Y-axis perpendicular to the Z-axis;

a column extending from the slide base substantially perpendicular thereto and having a column body which includes a guide surface in a direction of X-axis perpendicular to the Z-axis and to the Y-axis;

a cross slide slidably mounted on the guide surface of the column body in the direction of the X-axis and having a driving device; and a tool spindle rotatably mounted on the cross slide around B-axis perpendicular to the X-axis and to the Z axis and having a spindle rotatable around an axis perpendicular to the B-axis.

The invention will become more fully apparent from the claims and the description as it proceeds in connection with the drawings.

DETAILED DESCRIPTION OF THE PREFERRED EMBODIMENT

Figure 1:
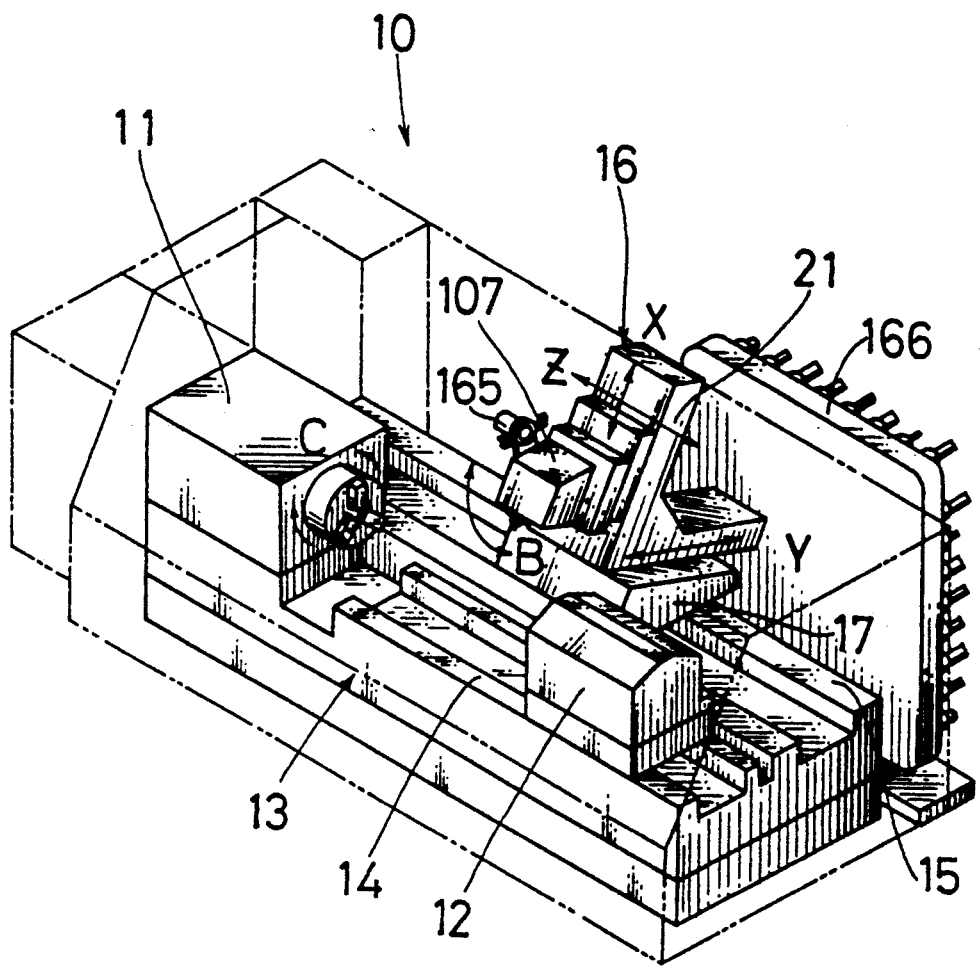
FIG. 1 is a schematic perspective view of a carriage structure of an NC lathe according to an embodiment of the present invention.
Figure 2:
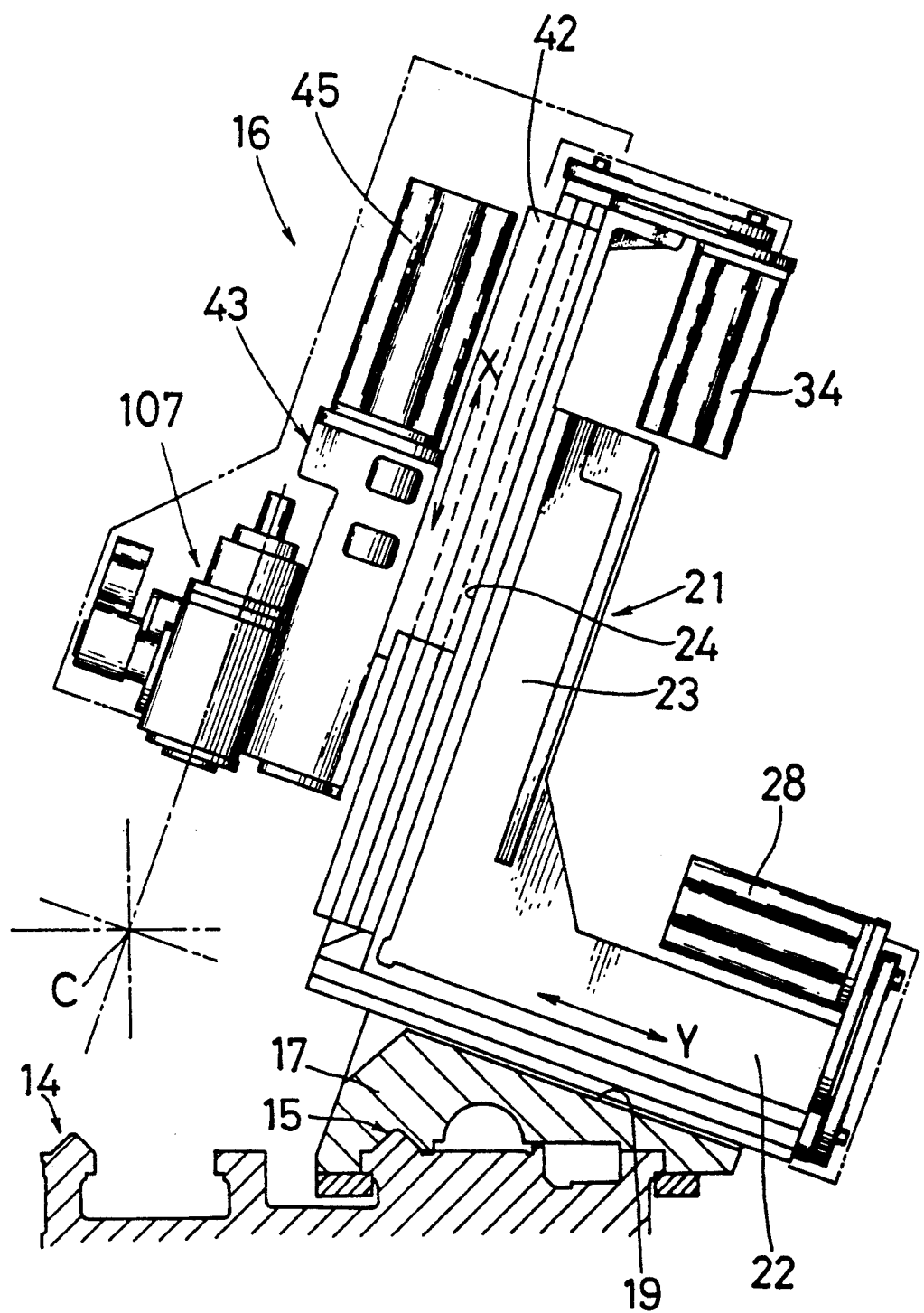
FIG. 2 is a side view of the carriage shown in FIG. 1.

Referring to FIG. 1, there is shown in schematic perspective form a carriage structure of an NC lathe 10 according to an embodiment of the present invention. The NC lathe 10 includes a bed 13 having a first guide surface 14 and a second guide surface 15 on which a tailstock 12 and a carriage 16 are mounted, respectively. A head stock 11 is mounted on the base 13 in opposed relation to the tailstock 12. The head stock 11 is controlled for its rotation around C-axis and has an indexing function around C-axis.

The carriage 16 includes a saddle 17 slidably mounted on the second guide surface 15 in a direction of Z-axis, a column 21 slidably mounted on an inclined guide surface 19 formed on the saddle 17 in a direction of Y-axis, a cross slide 42 slidably mounted on a guide surface 24 formed on the column 21 in a direction of X-axis, a tool base 43 mounted on the cross slide 42, a tool spindle 107 mounted on the tool base 43 and controlled for its rotation around B-axis, and an automatic tool change device (hereinafter called ATC) 165 mounted on the saddle 17 and movable theretogether.

Figure 3:
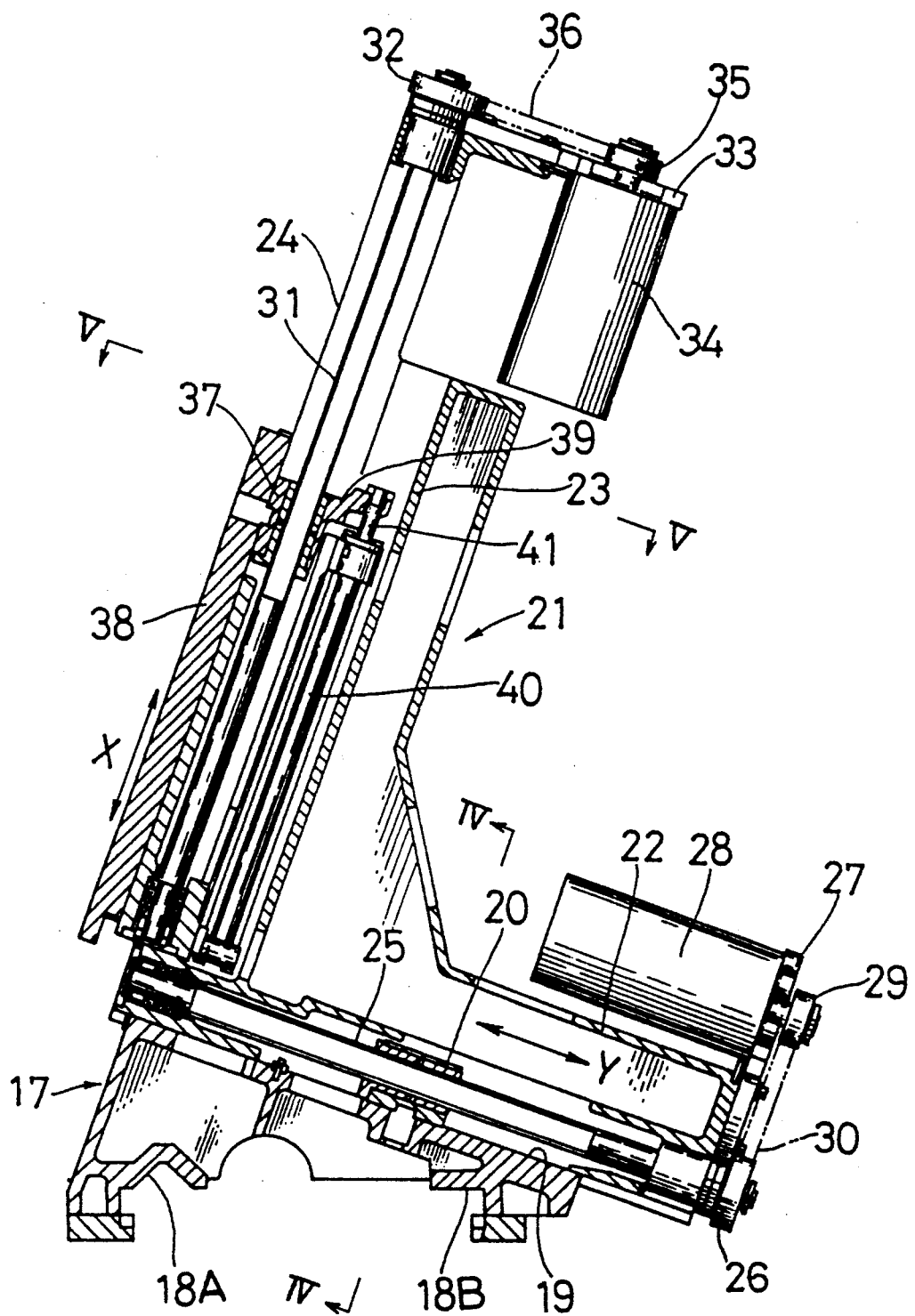
FIG. 3 is a sectional view of a column shown in FIG. 1.
Figure 4:
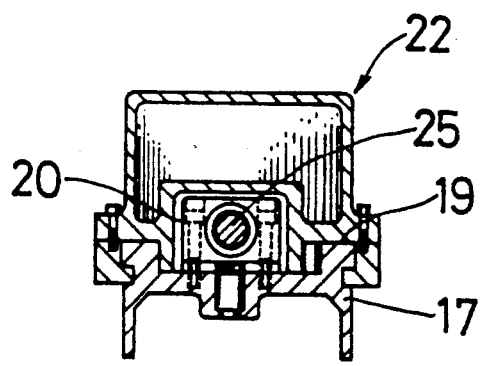
FIG. 4 is a sectional view taken along line IV—IV in FIG. 3.

As shown in FIG. 3, the saddle 17 has a triangular shape in section having a predetermined width. The saddle 17 includes a contact surface 18A having an inverted V-shaped configuration and a planer contact surface 18B for contacting the second guide surface 15 of the bed 13. The saddle 17 further includes an inclined guide surface 19 inclined at an angle of 20° relative to the contact surface 18B. The guide surface 19 is formed as a narrow guide surface in a direction of the Y-axis. As shown in FIG. 4, a ball screw nut 20 is in engagement with a first ball screw 25 which extends in a direction of the Y-axis and is supported by the column 21. The ball screw nut 20 is mounted at the central portion of the guide surface 19.

As shown in FIG. 3, the column 21 has L-shaped configuration and includes a slide base 22 slidably mounted on the guide surface 19 of the saddle 17 and a column body 23 which has a guide surface 24 extending at right angles with respect to the guide surface 19. The first ball screw 25 is rotatably mounted on the column 21 and has a pulley 26 at the rear end thereof. An AC servo motor 28 having a braking device is mounted on the rear end of the slide base 22 through a bracket 27 fixed to the slide base 22. A pulley 29 is mounted on an output shaft of the servo motor 28. An endless belt 30 is tensioned between the pulley 29 and the pulley 26.

A second ball screw extending in a direction of the X-axis is rotatably supported on the column body 23 and has a pulley 32 at the upper end thereof. An AC servo motor 34 having a braking device is mounted on the upper end of the column body 23 through a bracket 33 fixed to the column body 23. A pulley 35 is mounted on an output shaft of the servo motor 34, and an endless belt 36 is tensioned between the pulley 35 and the pulley 32. A ball screw nut 37 is in engagement with the second ball screw 31 for movement of the cross slide 42 along the guide surface 24.

Figure 5:
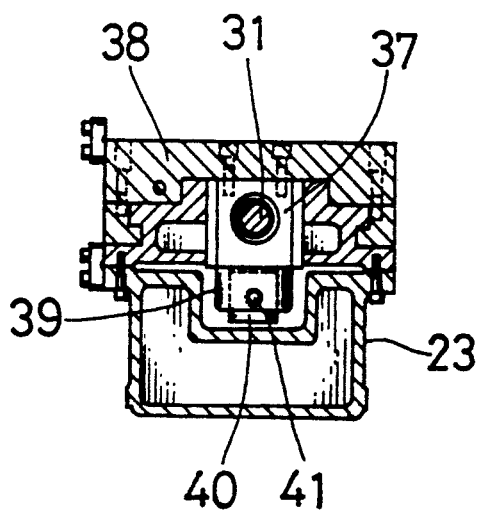
FIG. 5 is a sectional view taken along line V—V in FIG. 3.

As shown in FIG. 5, the ball screw nut 37 is formed with a mounting portion 38 for mounting on the cross slide 42 and is also formed with a bracket 39 connected with a piston rod 41 which is inserted within a balancing cylinder 40 juxtaposed with the second ball screw 31. The piston rod 41 of the balancing cylinder 40 extends or retracts to follow the movement of the ball screw nut 37 so as to balance the movement of the tool spindle 107 mounted on the cross slide 42.

The column 21 thus constructed is moved in a direction of the Y-axis along the inclined guide surface 19 when the AC servo motor 28 has been started. The cross slide 42 is moved in a direction of the X-axis along the guide surface 24.

Figure 6:
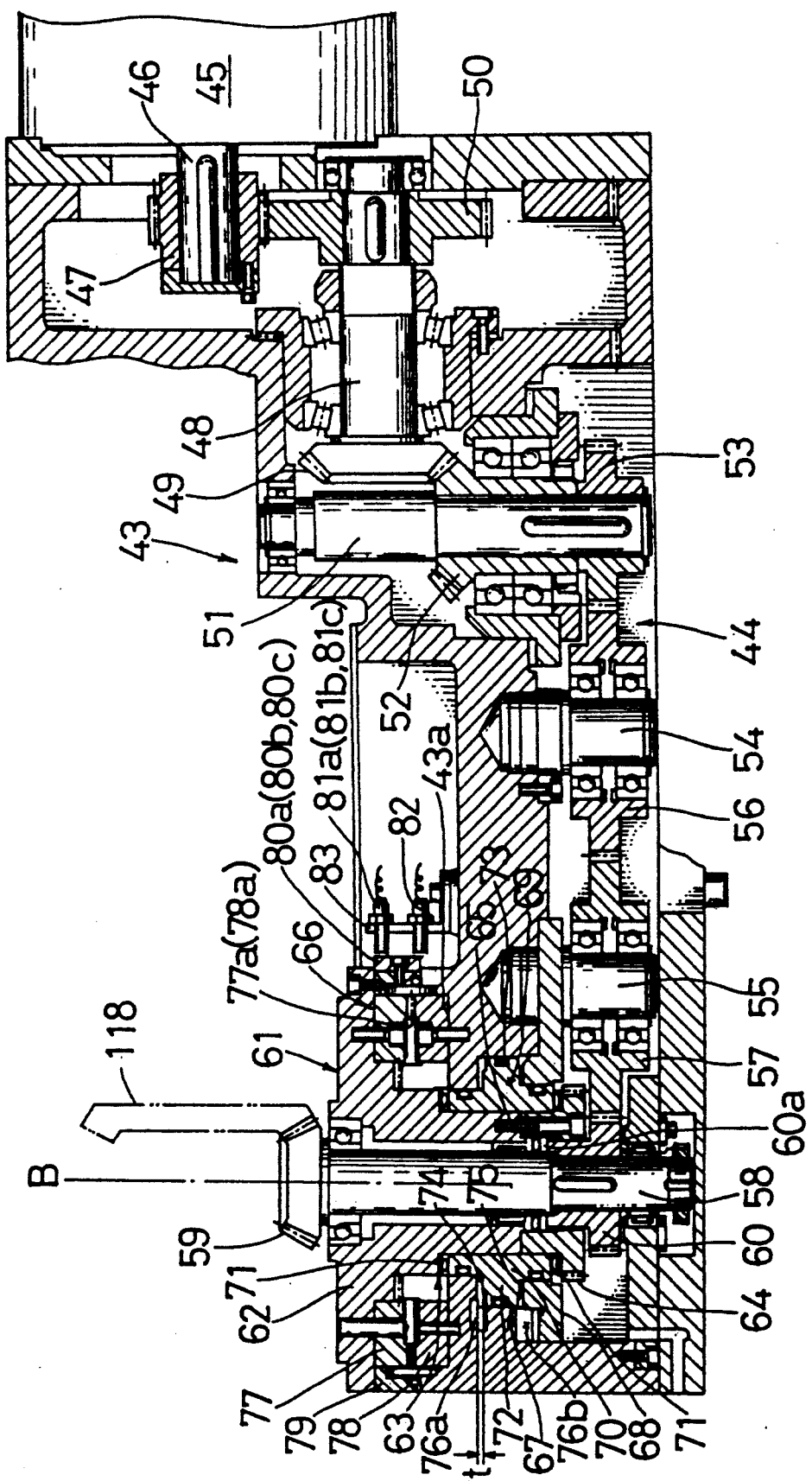
FIG. 6 is a sectional view of a tool base shown in FIG. 2.

The tool base 43 includes therein a driving device 44 for driving the tool spindle 107 (see FIG. 6), a three-position indexing device 85 for controlling the rotational position of the tool spindle 107 to index three positions B0°, B45° and B90° (see FIGS. 7 and 8), and a curvic coupling 66 for maintaining the indexed position.

A drive motor 45 is mounted on the rear portion of the tool base 43. A gear 47 is keyed on an output shaft 46 of the drive motor 45. A first shaft 48 is rotatably supported within the tool base 43 in parallel with the output shaft 46. A first spiral bevel gear 49 is formed integrally with one end of the first shaft 48. A first gear 50 is keyed on the other end of the first shaft 48 and is in engagement with the gear 47. A second shaft 51 is also rotatably supported within the tool base 3 and extends at right angles with respect to the first shaft 48. A second spiral bevel gear 52 and a second gear 53 is keyed on the second shaft 51. The second spiral bevel gear 52 is in engagement with the first spiral bevel gear 49.

A drive shaft 58 is disposed in parallel with the second shaft 51 and is spaced therefrom at a predetermined distance. A third shaft 54 and a fourth shaft 55 is disposed between the drive shaft 59 and the second shaft 51. A third gear 56 and a fourth gear 57 are rotatably supported by the third shaft 54 and the fourth shaft 55, respectively, and are in engagement with each other.

The lower portion of the drive shaft 58 is rotatably supported by the lower portion of the tool base 43, while the upper portion of the drive shaft 58 is rotatably supported by a rotary shaft 61. A spiral bevel gear 59 is integrally formed with the upper end of the drive shaft 58. A drive gear 60 is keyed on the drive shaft 58 at the lower position of the rotary shaft 61 and is in engagement with the fourth gear 57. A thrust bearing 60a is interposed between the drive gear 60 and the rotary shaft 61.

The three-position indexing device 85 functions to control the rotary shaft 61 so as to position the tool spindle 107 at any of three rotational positions of B0°, B45° and B90° around the B-axis. The tool spindle 107 is mounted on the tool base 43 so as to be driven by the drive shaft 58. The rotary shaft 61 includes a disc-like support portion 62 and a cylindrical support shaft 63. A rotary gear 64 is fixed to the end portion of the support shaft 63 through a bolt 65. The rotary shaft 61 thus constructed is rotatable relative to the drive shaft 58. The curvic coupling 66 is interposed between the rotary shaft 61 and the tool base 43.

The curvic coupling 66 includes an operating member 67 and a pair of coupling members 77 and 78. The operating member 67 has a lid 68 disposed between the support shaft 63 and the inner surface of the mounting portion of the tool base 43 formed to receive the rotary shaft 61. An annular piston chamber 69 is formed between the lid 68 and the inner surface of the mounting portion of the tool base 43 and has substantially T-shaped configuration turned sideways in section. A piston 70 is slidably mounted within the piston chamber 69. Thrust needle bearings 71 are interposed between the support shaft 63 and the upper portion of the piston 70 and between the rotary gear 64 and the lower portion of the piston 70, respectively. The piston 70 has a part 72 extending outwardly therefrom and received within an annular operation chamber 73 formed with the piston chamber 69. The operation chamber 73 is separated by the part 72 into an upper chamber 74 and a lower chamber 75 which are connected with hydraulic channels 76a and 76b, respectively. When a hydraulic pressure is applied to the lower chamber 75, the piston 70 is moved by a predetermined stroke t so as to cause upward movement of the rotary shaft 61 by the same stroke t. The coupling members 77 and 78 are interposed between the lower surface of the support portion 62 of the rotary shaft 61 and an upper surface 43a of the tool base 43.

Figure 9:
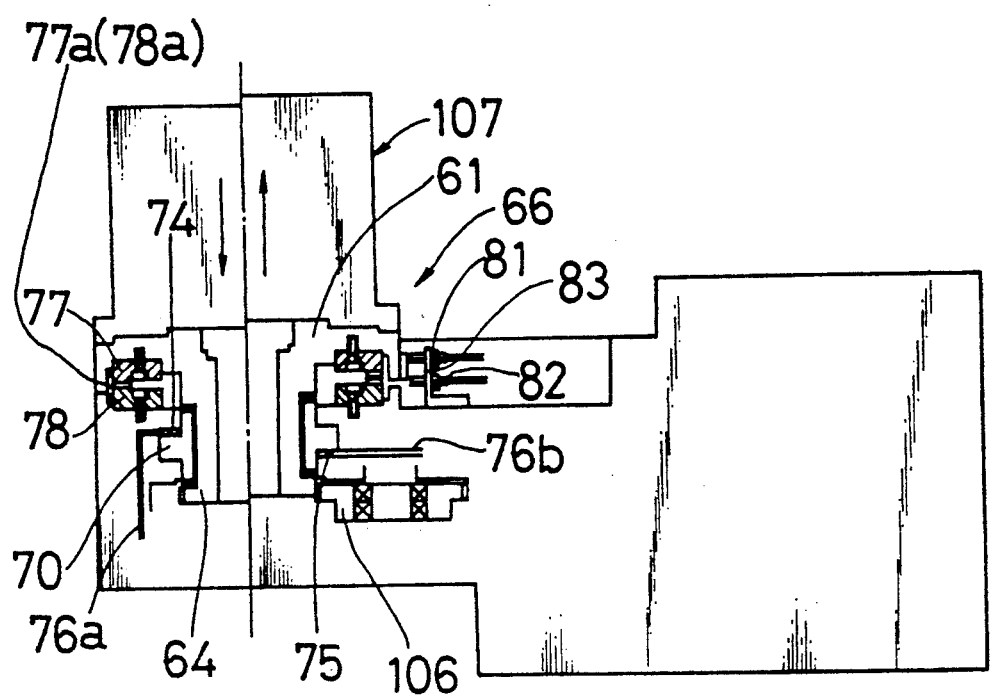
FIG. 9 is a schematic view showing operation of a curvic coupling device.
Figure 10:
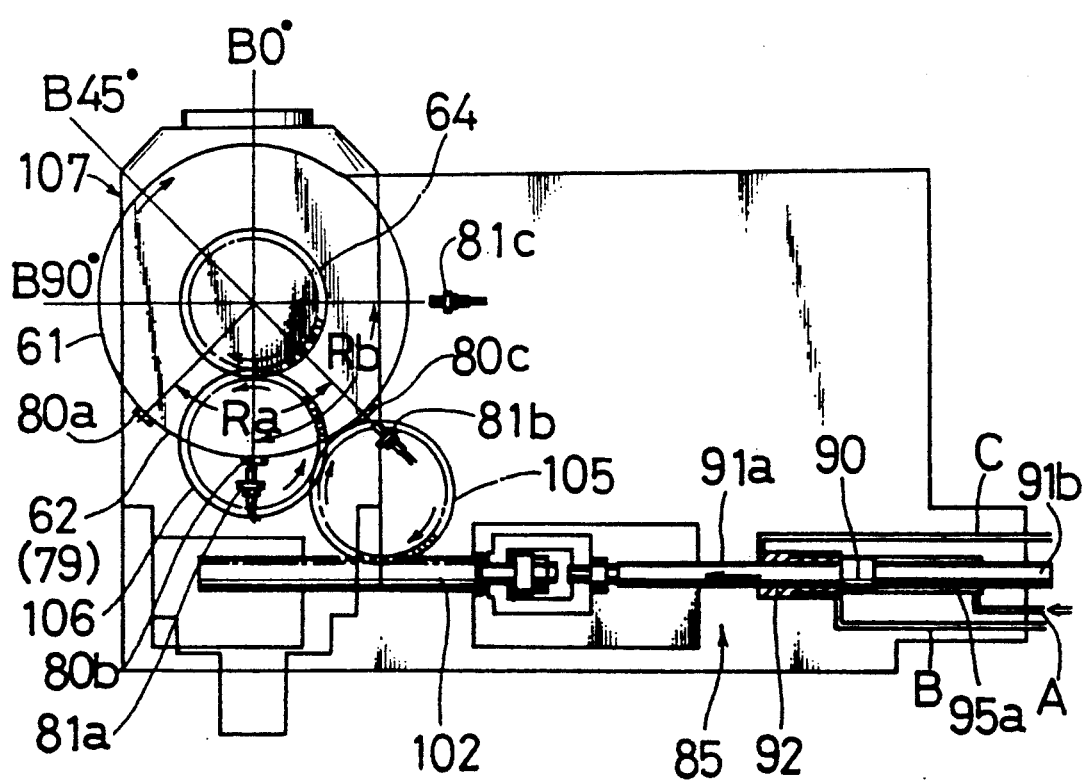
FIGS. 10 to 12 are schematic views showing operation of the three-position indexing device for indexing the position of the tool spindle to B0°, B45° and B90°, respectively.

As shown in FIG. 9, each of the coupling members 77 and 78 has a flat ring-like configuration and has a predetermined diameter. The coupling members 77 and 78 are opposed to each other and have face gear-like engaging teeth 77a and 78a at peripheral portions thereof, respectively. The engaging teeth 77a and 78a are engageable with or disengageable from each other through the movement of the operating member 67. A cover 79 is mounted on the peripheral portion of the support portion 62 of the rotary shaft 61. As shown in FIG. 10, dogs 80a, 80b and 80c are mounted on the peripheral portion of the cover 79 within a predetermined angular range R of 90° and are spaced from each other at an angle of 45°. On the other hand, proximity switches 81a, 81b and 81c for detecting the indexed position of the tool spindle 107 are mounted on the upper surface 43a of the tool base 43 through a bracket 83. The proximity switches 81a, 81b and 81c are disposed on a circumferential line outwardly adjacent a circumferential line on which the dogs 80a, 80b and 80c are disposed. Further, the proximity switches 81a, 81b and 81c are positioned within a predetermined angular range Rb of 90° and are spaced from each other at an angle of 45°. Another proximity switch 82 is mounted on the bracket 83 at the lower side of the proximity switch 81b for detecting engagement or disengagement of the coupling members 77 and 78. The three-position indexing device 85 is operably connected with the rotary shaft 61 thus constructed.

Figure 7:
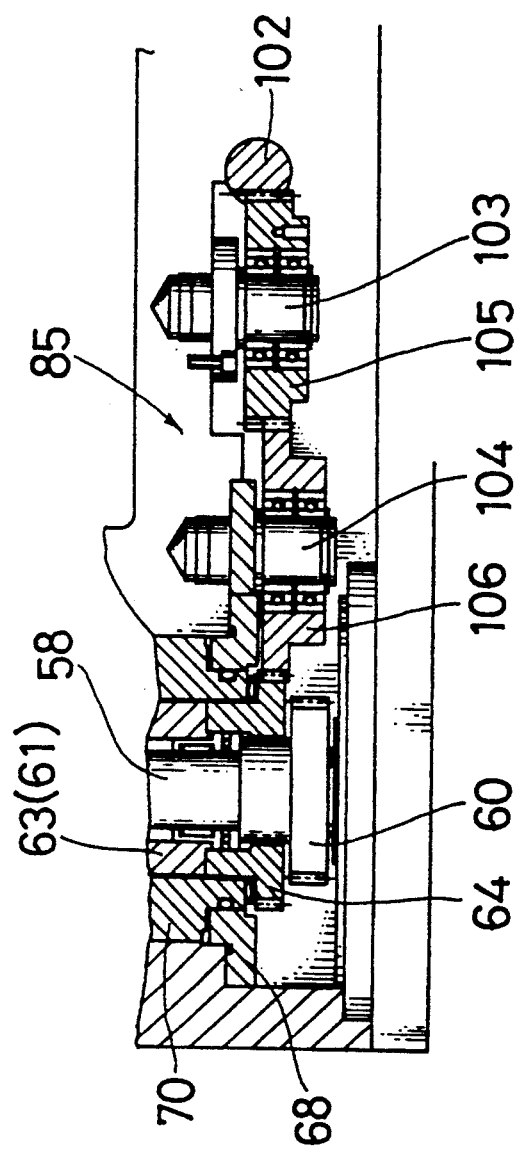
FIG. 7 is a sectional view showing a gear mechanism of a three-position indexing device.
Figure 8:
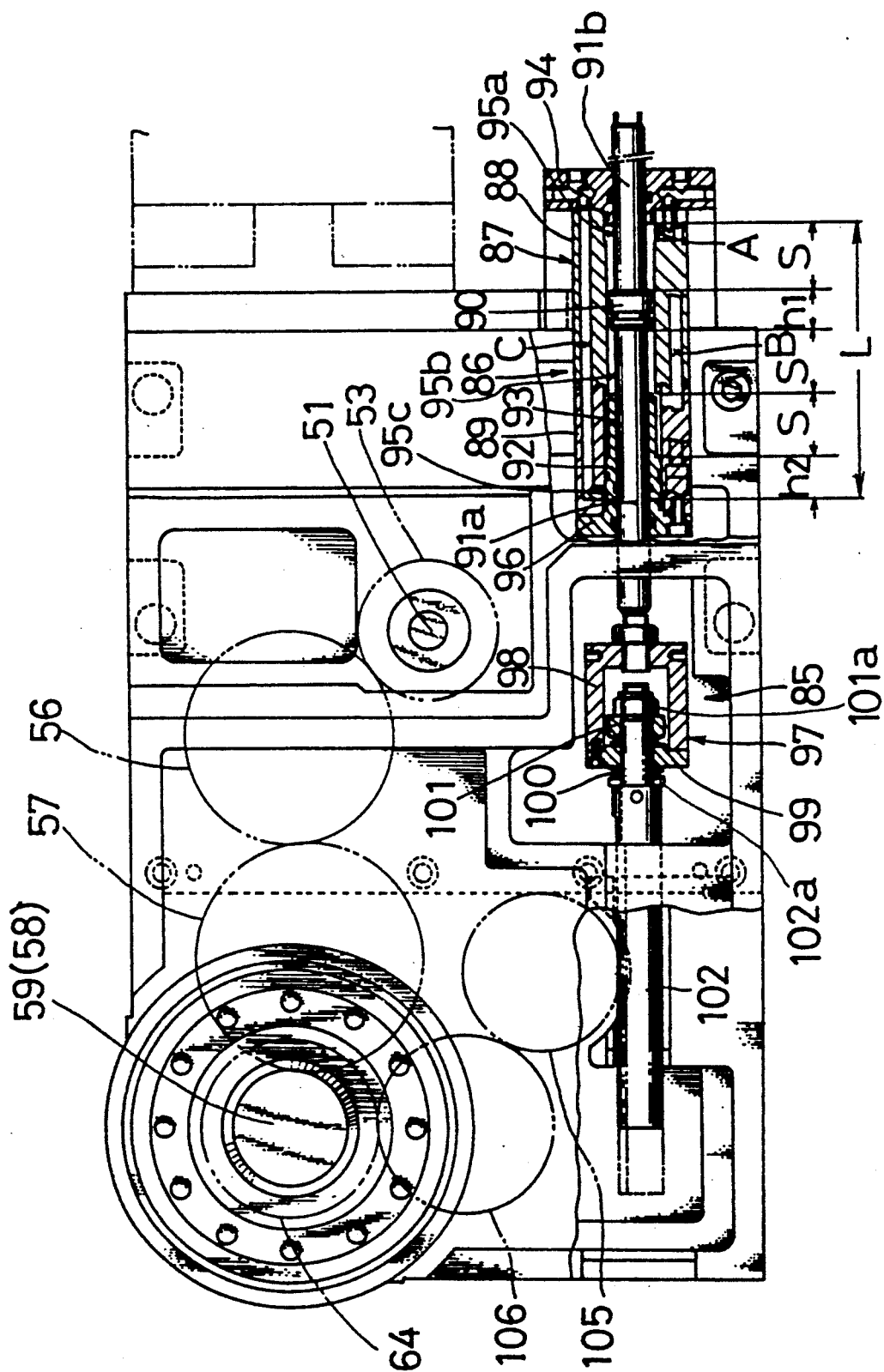
FIG. 8 is a plan view of the tool base with a part broken away.

As shown in FIGS. 7 and 8, the three-position indexing device 85 is disposed within the tool base 43 adjacent one side thereof and includes a piston-cylinder device 86, a rack 102 and intermediate gears 105 and 106 interposed between the rack 102 and the rotary gear 64 mounted on the rotary shaft 61 for connection therebetween.

The piston-cylinder device 86 includes a cylinder 87 which has a main portion 88 having a predetermined inner diameter and a sub portion 88 having a predetermined inner diameter and a sub portion 89 having an inner diameter slightly larger than that of the main portion 88. The main portion 88 and the sub portion 89 are coaxially positioned and are integrally connected with each other. A main piston 90 is slidably inserted within the main portion 88 and has a predetermined length h1. Piston rods 91a and 91b are integrally connected with the main piston 90 and extend therefrom forwardly and rearwardly, respectively. A sub piston 92 having a predetermined length h2 (=h1) is slidably mounted on the piston rod 91a and is slidably inserted within the sub cylinder 89. The sub piston 92 is integrally formed with a boss 93 which has a predetermined length S and is slidably movable within the main portion 88. A chamber 95a is formed between the main piston 90 and a lid 94 of the piston-cylinder device 86 and is communicated with a port A of a hydraulic circuit (not shown). A chamber 95b is formed between the main piston 90 and the sub piston 92 and is communicated with a port B of the hydraulic circuit. A chamber 95c is formed between the sub piston 92 and a lid 96 of the piston-cylinder device 86 and is communicated with a port C of the hydraulic circuit. The piston-cylinder device 86 thus constructed provides a stroke $L = 3S + 2h$ (h:h1 or h2). Here, the dimension S corresponds to the rotation of the rotary shaft 61 at an angle of 45° converted into the stroke of the rack 102. The rack 102 is connected with the piston rod 91a through a connecting member 97.

The connecting member 97 includes a substantially U-shaped joint portion 98 and a plate-like joint portion 99 fixedly connected with each other. The joint portion 98 is threadly connected with one end of the piston rod 91a of the main piston 90. The joint portion 99 is adjustably connected with one end of the rack 102. Thus, the one end of the rack 102 is inserted into the joint portion 99, and a nut 101a is threadably engaged with the extremity of the one end of the rack 102 so as to adjust the position of an adjusting member 101 inserted into the one end of the rack 102. A plurality of belville springs 100 are interposed between the adjusting member 102 and the joint portion 99 and between the joint portion 99 and a flanged portion 102a formed with the rack 102, so that the joint portion 99 is kept in position relative to the rack 102 through resilient forces of the belville springs 100. The piston rod 91 and the rack 102 is connected by the connecting member 97 in alignment with each other, so that the rack 102 moves linearly by the operation of the piston-cylinder device 86. The intermediate gears 105 and 106 are mounted on intermediate shafts 103 and 104, respectively, and transmit movement of the rack 102 to the rotary shaft 61 through the rotary gear 64.

With the three-position indexing device 85, for indexing the position of the tool spindle 107 from B45° or B90° to B0°, an operator commands the position B0° to an NC unit by MDI (Manual Data Input). The hydraulic pressure is applied to the lower chamber 75 through the hydraulic channel 76b of the operating member 67 of the curvic coupling 66 so as to move the piston 70 upwardly. The rotary shaft 61 on which the piston 70 is mounted is therefore moved upwardly by the stroke t, so that the coupling members 77 and 78 are disengaged from each other (see FIG. 9). The hydraulic pressure is subsequently applied to the chamber 95a through the port A of the piston-cylinder device 86, and the main piston 90 is moved leftwardly as shown in FIG. 10. With such movement of the main piston 90, the sub piston 92 abuts on the lid 96 while the main piston 90 abuts on the end portion of the boss 93 of the sub piston 92. This will cause movement of the rack 102 through the connecting member 97 by the stroke S where the position B45° is to be indexed or by the stroke S where the position B90° is to be indexed. As the rack 102 is thus moved, the intermediate gears 105 and 106 operably connected with the rack 102 are rotated in a clockwise direction and a counterclockwise direction in FIG. 8, respectively. The rotary gear 64 mounted on the rotary shaft 61 and engaged with the intermediate gear 106 is therefore rotated in the clockwise direction so as to index the position of the tool spindle 107 at B0°. The proximity switch 81a detects positioning of B0° through the dog 80b. Based on the output signal of the proximity switch 81a, the hydraulic pressure is applied from the hydraulic channel 76a to the upper chamber 74a of the operation chamber 73 so as to move the rotary shaft 61 downwardly. This will cause engagement of the coupling members 77 and 78 with each other, so that the tool spindle 107 is fixed in position at B0°. The proximity switch 82 detects such engagement of the coupling members 77 and 78 and outputs a control signal for subsequent operation.

Figure 11:
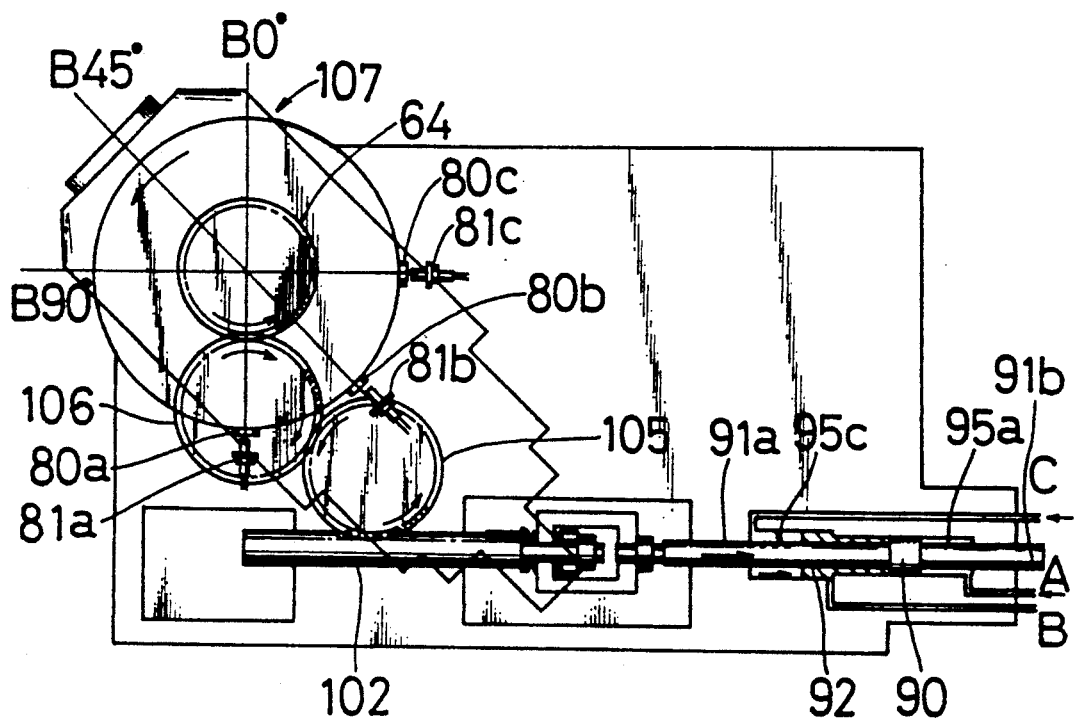

To index the position of the tool spindle 107 from B0° to B45°, the operator commands the position B45° to the NC unit by MDI. The hydraulic pressure is applied to the lower chamber 75 through the hydraulic channel 76b of the operating member 67 of the curvic coupling 66 so as to move the piston 70 upwardly. The rotary shaft 61 on which the piston 70 is mounted is therefore moved upwardly by the stroke t, so that the coupling members 77 and 78 are disengaged from each other (see FIG. 9). The hydraulic pressure is subsequently applied to the chamber 95a and the chamber 96c through the port A and the port C of the piston-cylinder device 86, respectively, and the main piston 90 and the sub piston 92 is moved together rightwardly in FIG. 10. Such movement of the main piston 90 and the sub piston 92 terminates when the sub piston 92 abuts on the end portion of the main cylinder 88 as shown in FIG. 11 after the boss 93 of the sub piston 92 has been slidably moved into the main cylinder 88. This will cause movement of the rack 102 by the stroke S. As the rack 102 is thus moved, the intermediate gears 105 and 106 operably connected with the rack 102 are rotated in the counterclockwise direction and the clockwise direction in FIG. 8, respectively. The rotary gear 64 mounted on the rotary shaft 61 and engaged with the intermediate gear 106 is therefore rotated in the counterclockwise direction so as to index the position of the tool spindle 107 at B45°. The proximity switch 81b detects positioning of B45° through the dog 80b. Based on the output signal of the proximity switch 81b, the hydraulic pressure is applied from the hydraulic channel 76a to the upper chamber 74a of the operation chamber 73 so as to move the rotary shaft 61 downwardly. This will cause engagement of the coupling members 77 and 78 with each other, so that the tool spindle 107 is held in position at B45°. The proximity switch 82 detects such engagement of the coupling members 77 and 78 and outputs the control signal for subsequent operation.

Figure 12:
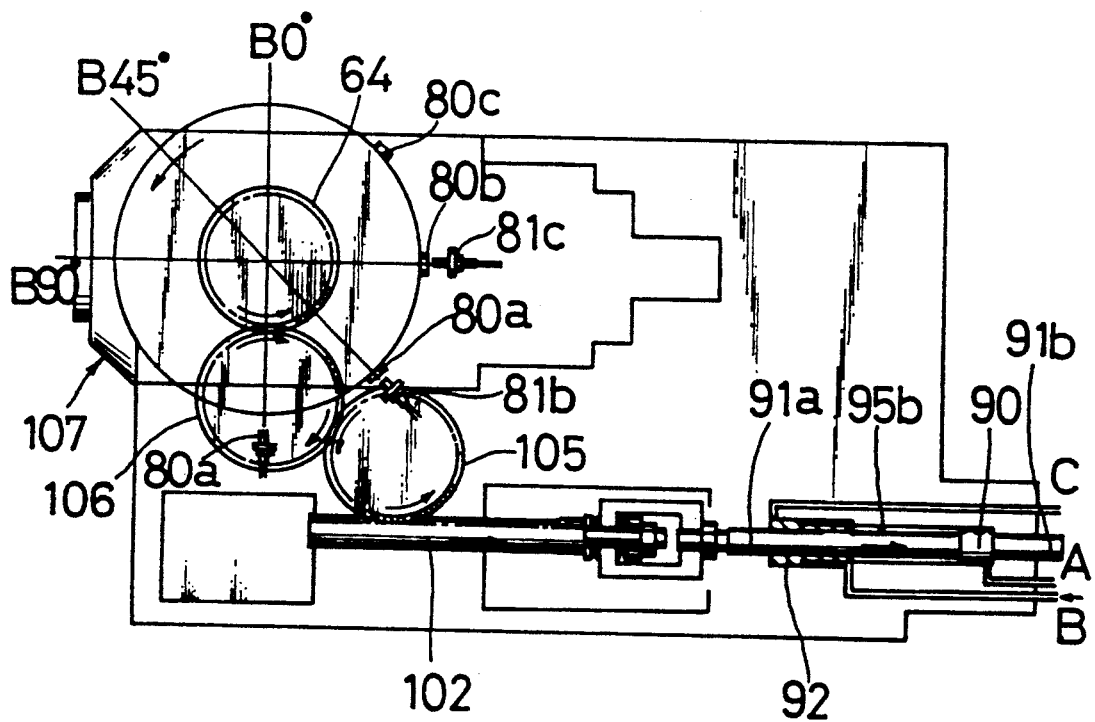

To index the position of the tool spindle 107 from B0° to B90°, the operator commands the position B90° to the NC unit by MDI. The hydraulic pressure is applied to the lower chamber 75 through the hydraulic channel 76b of the operating member 67 of the curvic coupling 66 so as to move the piston 70 upwardly. The rotary shaft 61 on which the piston 70 is mounted is therefore moved upwardly by the stroke t, so that the coupling members 77 and 78 are disengaged from each other. The hydraulic pressure is subsequently applied to the chamber 95b through the port B of the piston-cylinder device 86, and only the main piston 90 is moved rightwardly in FIG. 10. Such movement of the main piston 90 terminates when the main piston 90 abuts on the lid 94. This will cause movement of the rack 102 by the stroke 2S as shown in FIG. 12. As the rack 102 is thus moved, the intermediate gears 105 and 106 operably connected with the rack 102 are rotated in the counterclockwise direction and the clockwise direction in FIG. 8, respectively. The rotary gear 64 mounted on the rotary shaft 61 and engaged with the intermediate gear 106 is therefore rotated in the counterclockwise direction so as to index the position of the tool spindle 107 at B90°. The proximity switch 81c detects positioning of B90° through the dog 80b. Based on the output signal of the proximity switch 81c, the hydraulic pressure is applied from the hydraulic channel 76a to the upper chamber 74a of the operation chamber 73 so as to move the rotary shaft 61 downwardly. This will cause engagement of the coupling members 77 and 78 with each other, so that the tool spindle 107 is fixed in position at B90°. The proximity switch 82 detects such engagement of the coupling members 77 and 78 and outputs the control signal for subsequent operation.

To index the position of the tool spindle 107 from B90° to B45°, the hydraulic pressure is applied to the chambers 95a and the 95b through the port A and the port C, respectively, so that the main piston 90 and the sub piston 92 positioned as shown in FIG. 12 are moved toward each other. Such movement of the main piston 90 and the sub piston 92 terminates when the sub piston 92 abuts on the end portion of the main cylinder 88 after the movement of the boss 93 thereof to be slideably moved into the main cylinder 88 and when the main piston 90 abuts on the end portion of the boss 93. This may cause leftward movement of the rack 102 by the stroke S as shown in FIG. 11. As the rack 102 is thus moved, the intermediate gears 105 and 106 operably connected with the rack 102 are rotated in the clockwise direction and the counterclockwise direction in FIG. 8, respectively. The rotary gear 64 mounted on the rotary shaft 61 and engaged with the intermediate gear 106 is therefore rotated in the counterclockwise direction so as to index the position of the tool spindle 107 at B45°.

Figure 13:
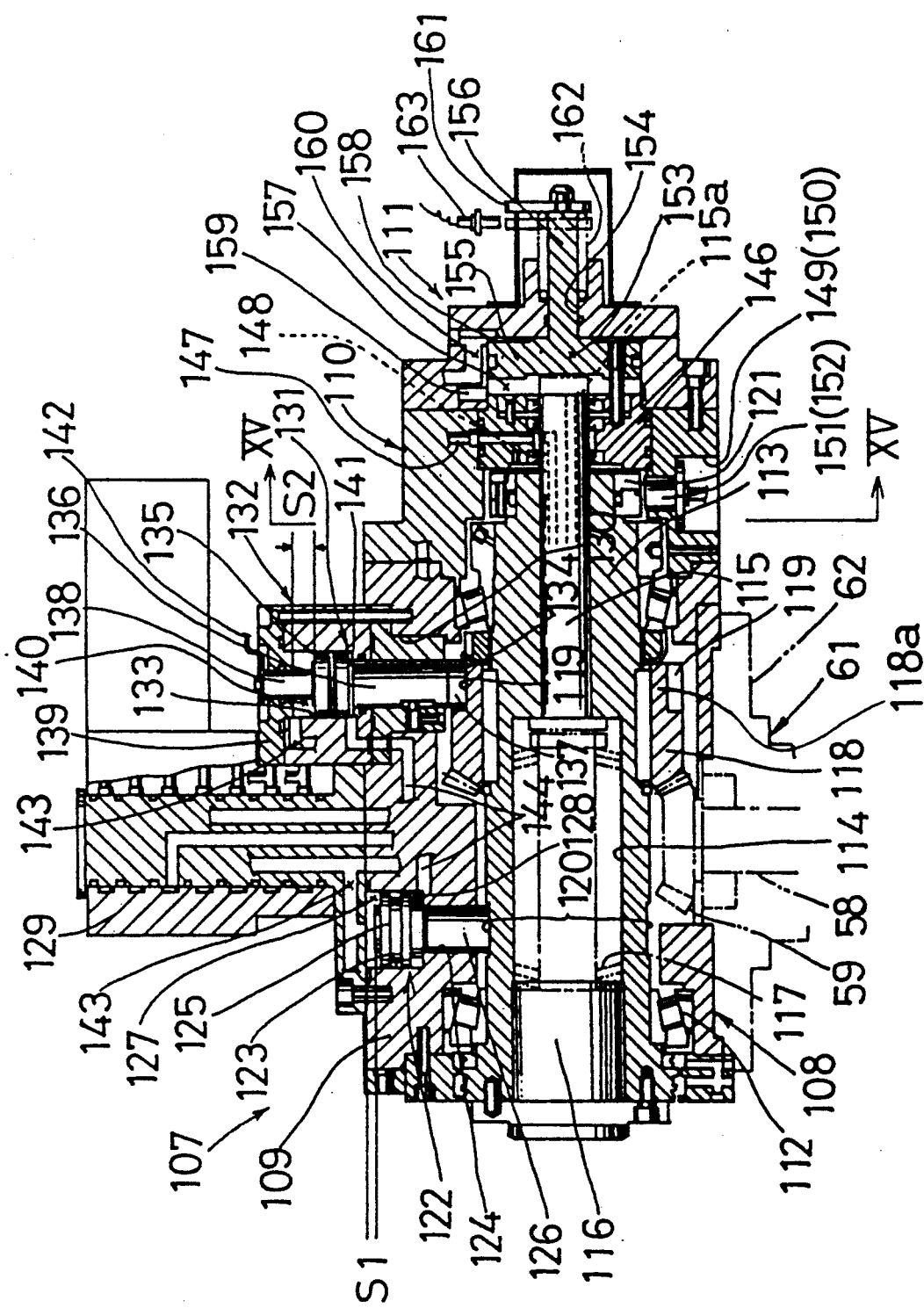
FIG. 13 is a sectional view of a tool spindle shown in FIG. 1.

The construction of the tool spindle 107 to be mounted on the support portion 62 of the tool base 43 will not be explained with reference to FIG. 13. The tool spindle 107 includes a body 108 for mounting on the support portion 62, a spindle 113 rotatably mounted on the body 108, a tool clamp shaft 115 inserted into the spindle 113 and forward and rearward lock device 122 and 123 for indexing the position of the spindle 113 at two positions or at angles of 0° and 90° and for fixing the indexed position of the spindle 113. The tool spindle 107 may operate for drilling, tapping and milling by the rotational movement of the spindle 113 while it may operate for turning with the spindle 113 fixed in position.

The body 108 includes a main portion 109, a sub portion 110 and a flange 111. The spindle 113 is rotatably supported within the main portion 109 through a bearing 112. A stepped bore 114 is formed in an axial direction of the spindle 113. A chuck 116 is mounted within the forward portion of the bore 114 and is connected with the tool clamp shaft 115 for clamping or unclamping a tool. The tool clamp shaft 115 is slidably movable within the bore 114 and the position of the tool clamp shaft 115 is held by a spring 117. A spiral bevel gear 118 is keyed on the spindle 113 for engagement with the spiral bevel gear 59 of the tool base 43. The spiral bevel gear 118 includes at the peripheral portion 118a thereof a pair of lock recesses 119 opposed to each other in a diametrical direction for indexing and fixing the position of the spindle 113 at 0° and 180°. The spindle 113 includes lock surfaces 120 which are formed at the forward portion thereof and disposed at angular positions corresponding to the lock recesses 119. A ring-like magnetic sensor 121 is mounted on the rear portion of the spindle 113, its position being adjustable relative to the spindle 113.

The forward and rearward lock devices 122 and 131 are mounted on the main body 109 at positions corresponding to the lock surfaces 120 and the lock recesses 119, respectively.

A piston chamber 123 is formed within the main portion 109 for receiving the forward lock device 122 and includes a hole 124 extending toward the spindle 113. The forward lock device 122 includes a piston 125 which is disposed within the piston chamber 123 and separates the piston chamber 123 into upper and lower chambers 127 and 128. The piston 125 has a lock rod 126 which is slidably movable within the hole 124 for engagement with any of the lock surfaces 120 of the spindle 113. A rotary joint 129 is mounted on the upper portion of the main body 109 for distribution of a compressed air, a hydraulic fluid and cutting fluid, etc. The piston chamber 123 is closed by the rotary joint 129.

The rearward lock device 131 is mounted within a stepped mounting bore 130 formed in the main body 109. The rearward lock device 131 includes a cylindrical body 132 having a bore 134 to form a piston chamber 133 and a hole 134 extending toward the spindle 113. A piston 135 is slidably mounted within the piston chamber 133 and has a lock rod 136 slidably inserted within the hole 134. The lock rod 136 includes at the lower end thereof a lock claw 137 for engagement with the rock recesses 119 of the spindle 113. A piston cover 139 is mounted on the upper end of the cylindrical body 132. A detector rod 138 is slidably inserted into the piston cover 139 and has a detector dog 142 at the upper end thereof. The piston chamber 133 is separated by the piston 135 into upper and lower chambers 140 and 141.

The upper chambers 127 and 140 and the lower chambers 128 and 141 of the forward and rearward lock devices 122 and 131 are connected with the rotary joint 129 through hydraulic channels 143 and 144, respectively, so that the forward and rearward lock devices 122 and 131 can be operated to move the lock rods 126 and 136 by predetermined strokes S1 and S2 for engagement with any of the lock recesses 119 and any of the lock surfaces 120, respectively. A proximity switch 145 is mounted on the main portion 109 in the vicinity of the detector dog 142 for detecting engagement or disengagement of the lock rods 126 and 136.

Figure 14:
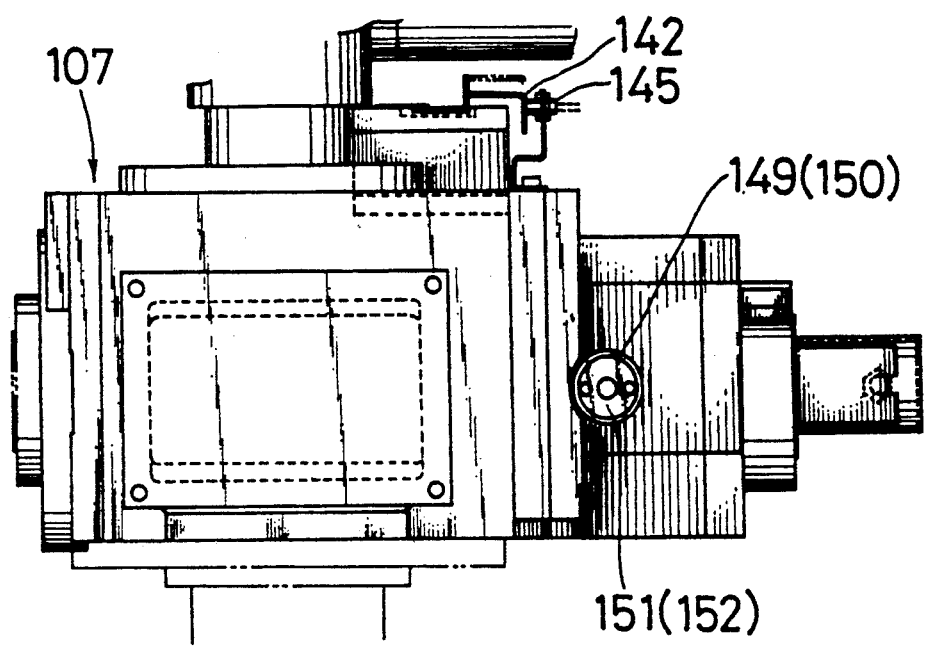
FIG. 14 is a side view of the tool spindle.
Figure 15:
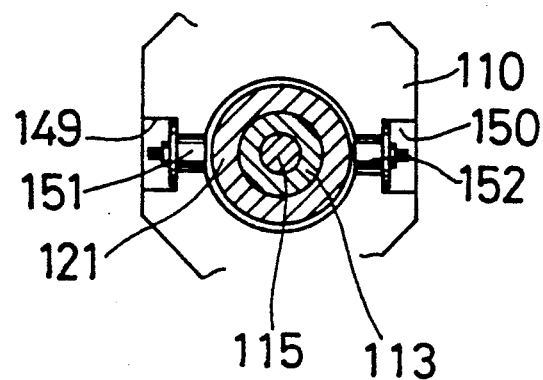
FIG. 15 is a sectional view taken along line XV—XV in FIG. 13 with a part omitted.
Figure 16:
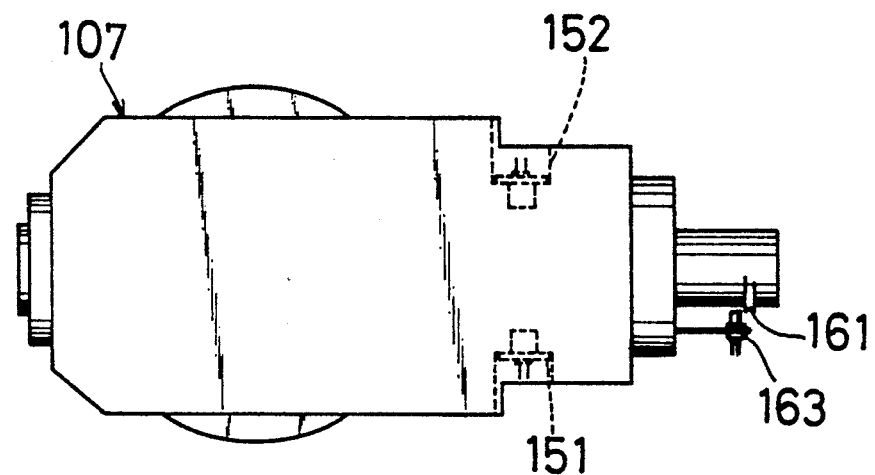
FIG. 16 is a schematic plan view of the tool spindle.

The rear end of the tool clamp shaft 115 extends from the rear end of the spindle 113 at a predetermined distance. A seal member 146 is fitted on the rear end of the tool clamp shaft 115 and is inserted into the sub portion 110. The seal member 146 includes an air channel 147 which is connected with a flow sensor (not shown) and is communicated with an air channel 148 formed in the tool clamp shaft 115 for detecting as to whether the tool is mounted on or removed from the chuck 116. The sub member 110 includes recesses 149 and 150 which are disposed at an axial position corresponding to the magnetic sensor 121 mounted on the spindle 113 and are diametrically opposed to each other or displaced from each other at an angle of 180°. Magnetic sensor heads 151 and 152 are mounted within the recesses 149 and 150 for detecting the indexed position of the spindle 113 at an angle of 0° or at an angle of 180° as shown in FIGS. 14 to 16.

The flange 111 is formed with a piston chamber 153 in which a piston 155 is slidably mounted. The piston chamber 153 is communicated with a bore 154 for receiving a piston rod 156 of the piston 155. The piston chamber 153 is separated into two chambers 157 and 158 which are connected with the rotary joint 129 through a cutting coolant channel 159 and a hydraulic fluid channel 60, respectively. A detector dog 161 is mounted on the rear end of the piston rod 156. A coil spring 162 is interposed between the flange 111 and the detector dog 161 for biasing the piston 155 in a forward direction as shown in FIG. 13. A proximity switch 163 is disposed in the vicinity of the detector dog 161 for detecting as to whether the tool is clamped or unclamped. The chamber 157 is communicated with an axial bore 115a formed within the tool clamp shaft 115 for supplying cutting coolant to the tool.

Figure 31:
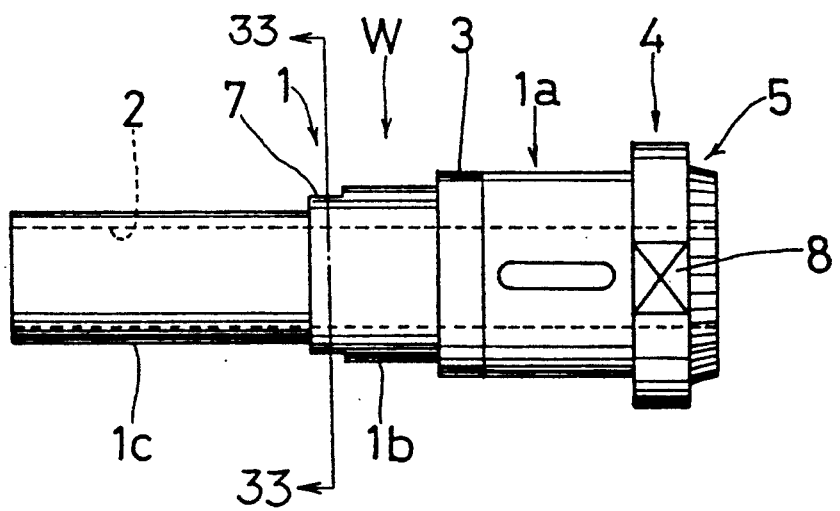
FIG. 31 is a front view of a work to be formed.
Figure 32:
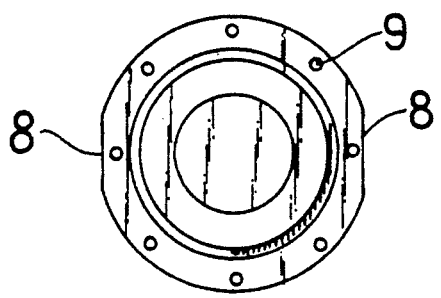
FIG. 32 is a side view of the work shown in FIG. 31.
Figure 33:
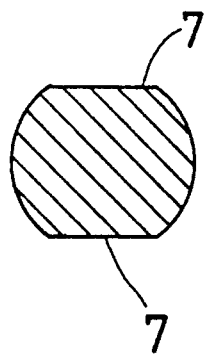
FIG. 33 is a sectional view taken along line 33—33 in FIG. 31.

The operation of the tool spindle 107 thus constructed will now be explained in connection with machining steps of the work W shown in FIGS. 31 to 33. The tool spindle 107 may be operated at the following modes:

(1) Right- and left-hand cutting mode using a cutting tool with the tool spindle 107 indexed at a position 0° or 180° so as to change the direction of the cutting edge of the tool by turning at an angle of 180°;

(2) Turning mode using a turning tool at any of the positions B0°, B45° and B90° with the spindle 113 locked by the lock devices 122 and 131; and (3) Rotary cutting mode for drilling, tapping or milling operation at any of the positions B0°, B45° and B90° with the spindle 113 unlocked by the lock devices 122 and 131.

Here, the tool can be exchanged when the tool spindle 107 is positioned at B0°.

Figure 17:
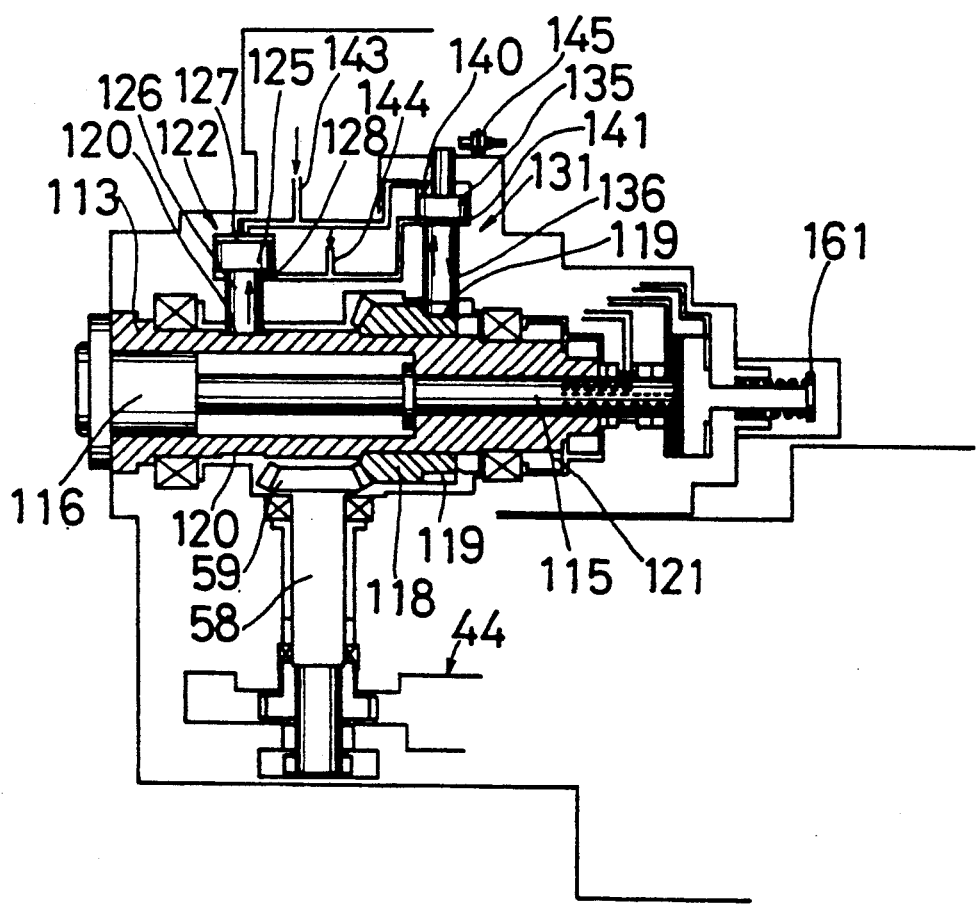
FIG. 17 is a schematic view showing operation of the tool spindle to index the position of the spindle to either of two positions between 0° and 180°.
Figure 26:
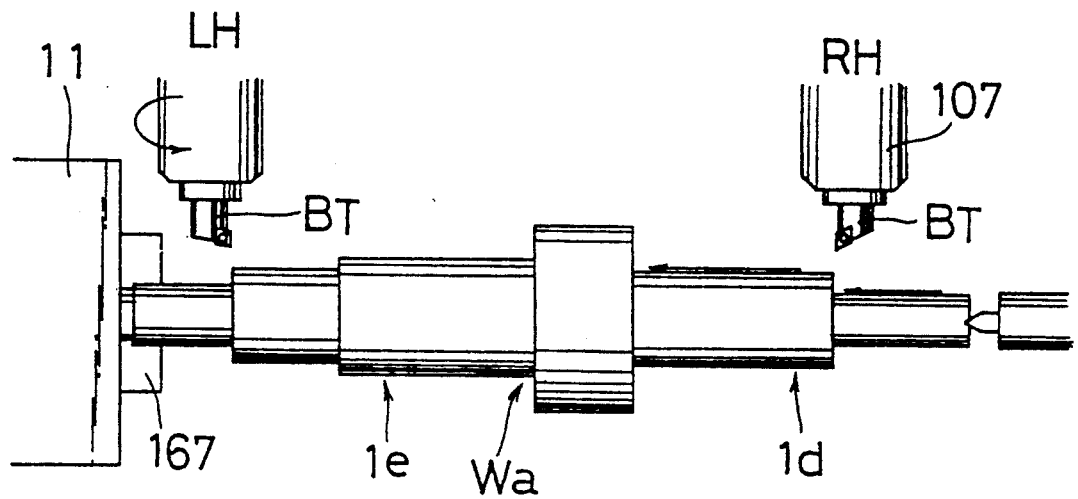
FIGS. 26 and 27 are schematic views showing right- and left-hand cutting mode of the tool spindle at the positions B90° and B0°, respectively.

To index the position 0° of the spindle 113, the operator commands the NC unit to index the position 0° by MDI. The hydraulic pressure is applied to the lower chambers 128 and 141 of the lock devices 122 and 131 through the hydraulic fluid channel 144 so as to move the pistons 125 and 135 upwardly. The lock rods 126 and 136 are thus disengaged from the lock recesses 119 and the lock surfaces 120, respectively, so that the spindle 113 becomes free to rotate. The proximity switch 145 detects such disengagement through the detector dog 142 mounted on the piston 135 and outputs signal to start the drive motor 45 of the tool base 43 for rotation of the drive shaft 58 through the driving device 44. The spindle 113 is thus rotated by the drive shaft 58 through spiral bevel gears 59 and 118 which are in engagement with each other (see FIG. 17). When the spindle 113 has been rotated to reach a position where the magnetic sensor 121 is detected by the magnetic sensor head 151, the drive motor 45 is stopped and the hydraulic pressure is simultaneously applied to the upper chambers 127 and 140 of the lock devices 122 and 131 through the hydraulic channel 143. The pistons 125 and 135 are therefore moved downwardly so as to engage the lock rods 126 and 136 with any of the lock surfaces 120 and any of the lock recesses 119, respectively. Such engagement can be recognized by the operator since the detector dog 142 moves away from the proximity switch 145. The spindle 113 is thus indexed to the position 0° and is fixed at this position. At this stage, a turning tool BT clamped by the chuck 116 is positioned at a rightward position RH relative to the axis of the work W as shown in FIG. 26.

Figure 18:
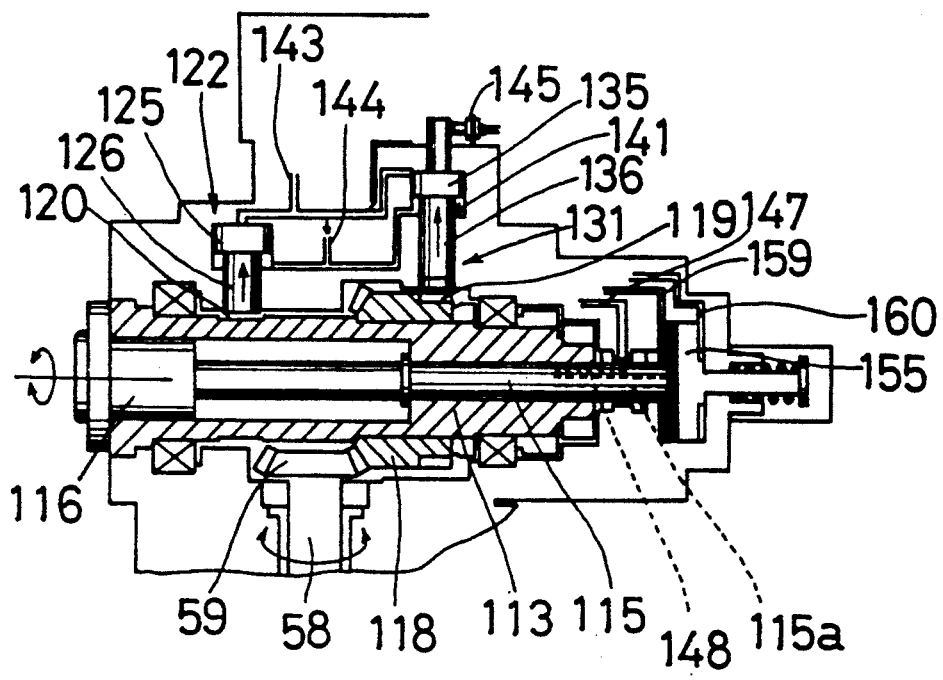
FIG. 18 is a schematic view of the tool spindle in a rotary cutting mode with the spindle unlocked.
Figure 19:
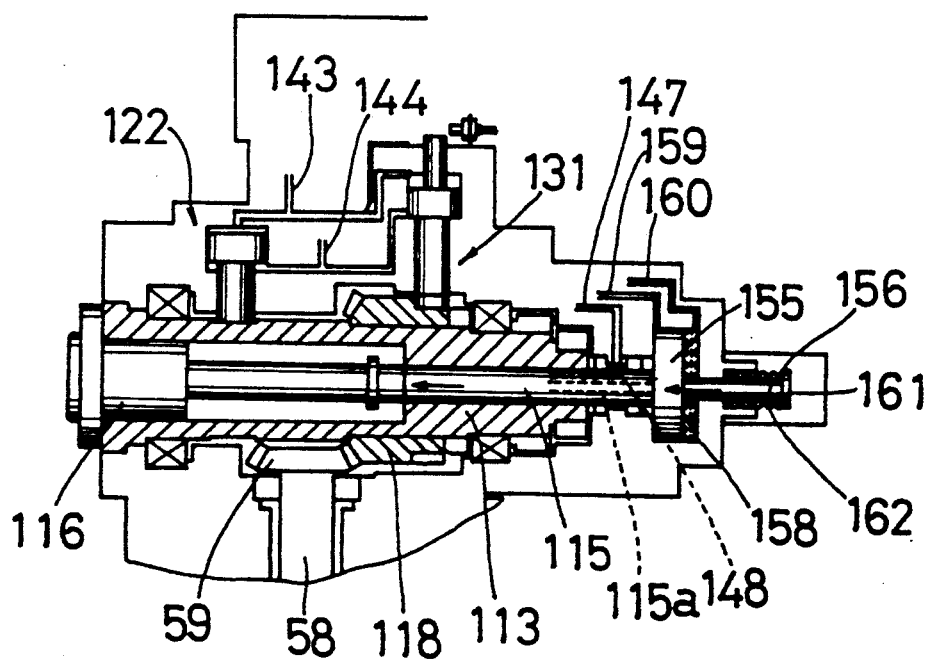
FIG. 19 is a view similar to FIG. 18 but showing the operation of the tool spindle for changing a tool.

The operation for indexing the position 180° is substantially the same as the above operation. The operator commands the NC unit to index the position of the spindle 113 to an angle of 180°. This operation to index the position of 180° is completed when the magnetic sensor 121 is detected by the magnetic sensor head 152. At this stage, the turning tool BT is positioned at a leftward position LH relative to the axis of the work as shown in FIG. 26. The spindle 113 can be driven by the driving device 44 when the lock devices 122 and 131 have been unlocked as shown in FIG. 18, so that the rotary cutting mode can be performed. To exchange the tool, firstly the three-position indexing device 85 is operated to index the position of the tool spindle 107 to the position B0°. At this stage, the spindle 113 of the tool spindle 107 is positioned at 0°. The operator subsequently commands the NC unit for changing the tool by MDI. Thus, the hydraulic pressure is applied to the chamber 158 through the hydraulic channel 160 so as to move the piston 155 leftwardly in FIG. 19, so that the tool clamp shaft 115 is moved leftwardly. This will disengage the tool from the chuck 116 and such disengagement from the chuck 116 is detected by the proximity switch 163 through the detector dog 161 mounted on the piston rod 156. Based on a signal thus detected by the proximity switch 163, the ATC 166 changes the tool to another required tool within a predetermined period of time. When the tool is removed from the chuck 116, the air supplied from the air channel formed in the seal member 146 to the flow channel 148 formed in the tool clamp shaft 115 may flow to the outside. On the other hand, when the another tool is mounted on the chuck 116, the flow channel 148 is closed by this tool, so that the flow sensor can detect as to whether the tool has been mounted. Based on a signal detected by the flow sensor, the hydraulic pressure applied to the chamber 158 is released, and the piston 155 is returned to its original position by the biasing force of the coil spring 117. The another tool is therefore clamped by the chuck 116 and the proximity switch 163 detects such clamping by the chuck 116. The operation to exchange the tool is thus completed.

Turning to FIG. 1, the NC lathe 10 is provided with a tool magazine 166. The tool magazine 166 as well as the ATC 165 is movable together with the saddle 117, and it permits change of the tool at the indexed position B0° of the tool spindle 107. Further, the change of the work W as well as the change of a chuck 167 of the headstock 11 (see FIG. 20) can be performed by a robot (not shown) disposed at the front side of the carriage 16.

Figure 20:
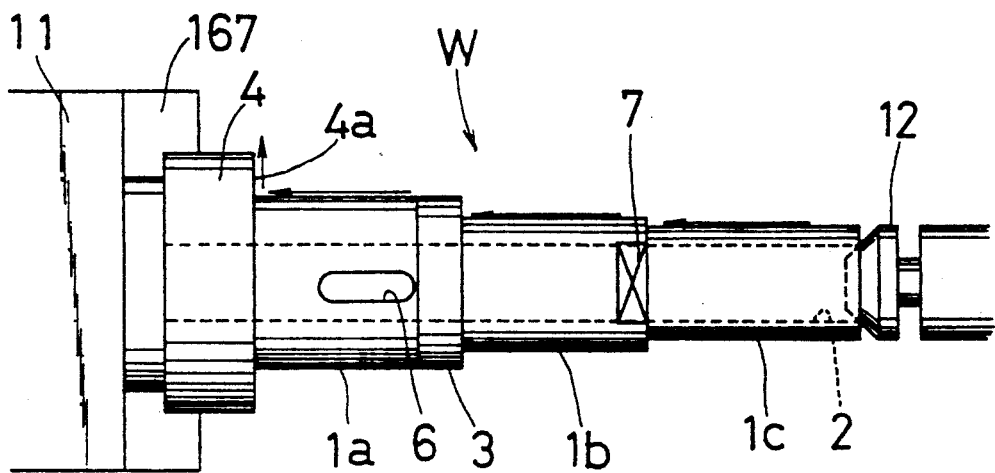
FIG. 20 is a front view of a work machined by the NC lathe of this embodiment through a first machining step.
Figure 21:
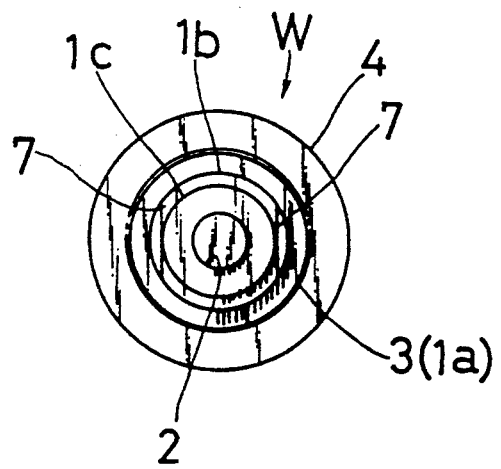
FIG. 21 is a side view of the work machined through the first machining step.
Figure 22:
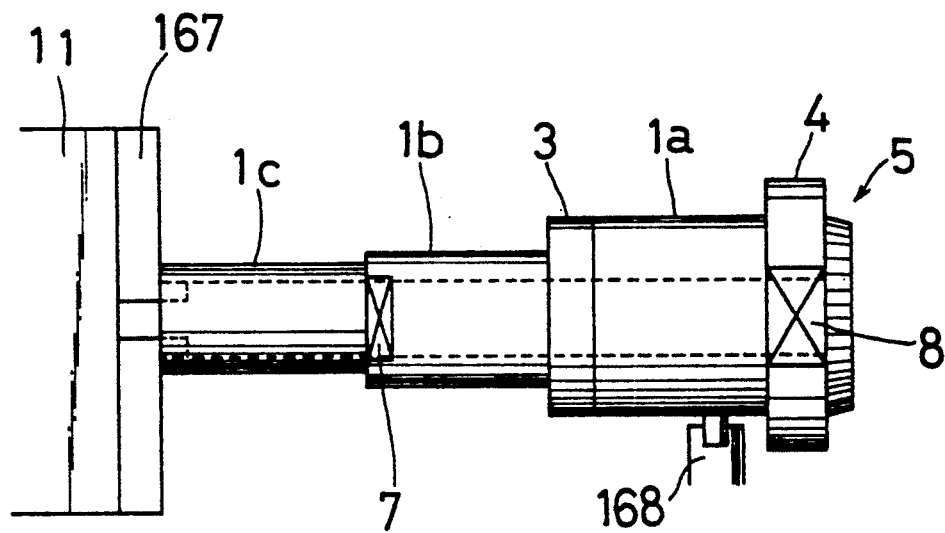
FIG. 22 is a front view of the work machined through a second machining step.
Figure 23:
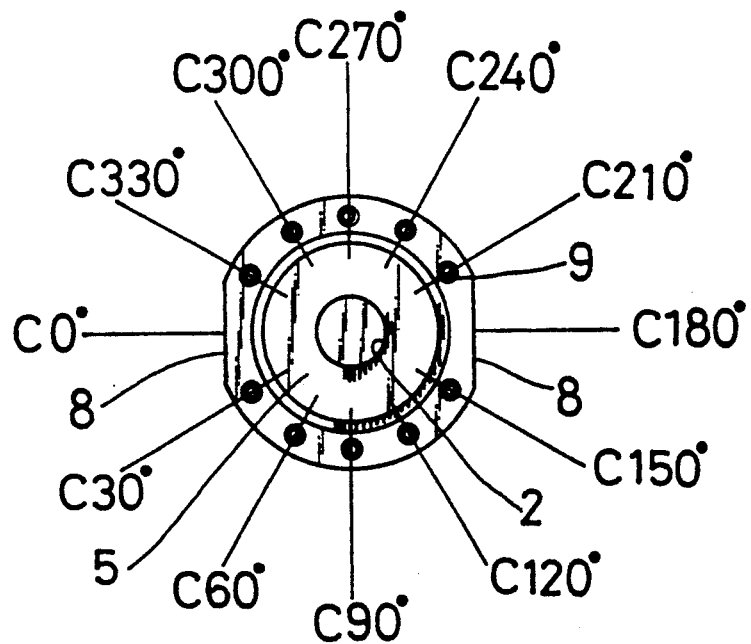
FIG. 23 is a side view of the work machined through the second machining step.

The operation of the NC lathe 10 equipped with the carriage 16 as described above will not be explained in connection with the machining operation of the work W. The material of the work W has a cylindrical configuration having an inner surface 2. FIGS. 20 and 21 show a first machining step, and FIGS. 22 and 23 show a second machining step.

Figure 25:
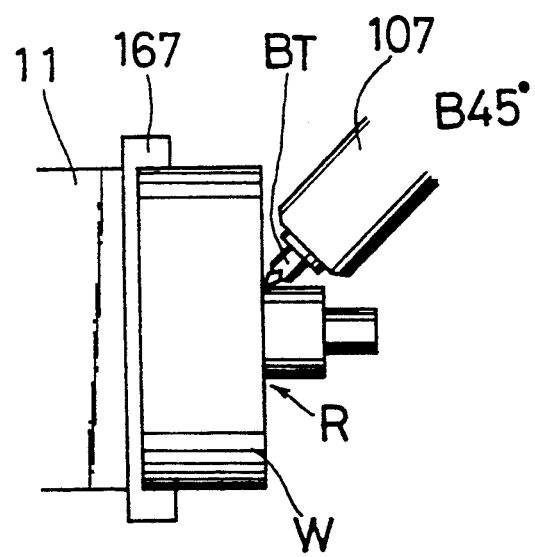
FIG. 25 is a front view showing the turning operation with the tool spindle positioned at B45°.

Firstly, the chuck 167 of the headstock 11 is automatically changed by the robot to one appropriate for the first machining step. The work W is conveyed by the robot to a position for setting the work W by clamping it with the chuck 167 and moving the tailstock 12 toward the headstock 11 so as to press it on the end portion of the inner surface 2 of the work W. At this stage, the headstock 11 is indexed to a position C0°. On the other hand, the tool spindle 107 is indexed to the position B0°0 by the three-position indexing device 85, and a turning tool BT for rough finishing is transferred from the tool magazine 166 and is set by the ATC 165. The tool spindle 107 is thereafter indexed to the position B90° and is fixed in position by the curvic coupling device 66. The spindle 113 is locked by the lock devices 122 and 131 for turning mode. Firstly, the stepped surfaces 1b, 1b and 1c having different diameters as well as the end surface 4a of a flange 4 of the work W are roughly machined with the headstock 11 driven under numerical control of the position of the carriage 16 concerning X-axis and Z-axis. In case that there is a large difference between the diameter of the flange 4 and that of the surface 1a, the tool spindle 107 will be indexed to the position B45°, so that the machining of a corner portion R can be easily made as shown in FIG. 25. The turning tool BT is thereafter changed to one for semi-finishing of the surfaces 1a, 1b, 1c and 4a and is subsequently changed to one for final finishing of these surfaces through the same operation as described in connection with the turning tool BT for rough finishing.

The finishing turning tool BT is thereafter changed to a threading tool to form a thread 3 at the indexed position of B90° in the turning mode.

The threading tool is subsequently changed to a different tool by the ATC 165 at B0° to roughly form a key recess 6. Such roughing tool has a diameter slightly smaller than the width of the key recess 6 to be formed. The tool spindle 107 is thereafter indexed to the position B90° and is fixed at this position while the lock device 122 and 131 are positioned not to lock the spindle 113 as shown in FIG. 18 for the rotary cutting mode. On the other hand, the headstock 11 is positioned at C0° so as to fix the work W at this position. The drive motor 45 of the driving device 44 is thereafter started to rotate the spindle 113 to machine the key recess 6 while the depth of cut of the key recess 6 and the feeding amount are determined through numerical control with respect to the directions of the X-axis and the Z-axis, respectively. The roughing tool is thereafter changed by the ATC 165 at B0° to one for finishing which has a diameter substantially corresponding to the width of the key recess 6 to be formed. The fool spindle 107 is thereafter indexed again to the position B90° for finishing the key recess 6 under numerical control with respect to the X-axis and the Y-axis.

The finishing tool for the key recess 6 is subsequently changed through the ATC 165 at B0° to a tool for forming the flat surfaces 7. The tool spindle 107 is thereafter indexed to the position B90° and is fixed at this position for the rotary cuttin mode. At this stage, the work W is positioned by the headstock 12 at C0°. The spindle 113 is driven by the driving device 44 while the depth of cut and the feeding amount are determined through numerical control with respect to the directions of the X-axis and the Z-axis, respectively, to form one of the flat surfaces 7. The work W is subsequently indexed to the position C180° so that the other of the flat surfaces 7 can be formed symmetrically with the surface 7 previously formed as shown in FIG. 21.

After completion of forming the flat surfaces 7, the work W is held in position by a bracing device 168, and thereafter the tailstock 12 is retracted as shown in FIG. 22. The tool spindle 107 is indexed to the position B0° for changing the tool to that for roughly machining the inner surface 2 by the ATC 165. The tool spindle 107 is thereafter set for the turning mode. The inner surface 2 of the work W is machined with the work W rotated by the headstock 11 while the depth of cut and the feeding amount are determined through numerical control with respect to the directions of the X-axis and the Z-axis, respectively. The tool for roughly machining the inner surface 2 is thereafter changed to a tool for finishing the inner surface 2 by the same operation as the rough finishing tool. The first machining step is thus completed and the headstock 11 is indexed to the position C0°.

The second machining step will now be explained with reference to FIGS. 22 and 23. Before performing the second step, the work W is removed from the chuck 167 by the robot and is thereafter put on a work table (not shown). The chuck 167 is changed by the robot to that suitable for the second machining step and the headstock 11 is indexed to the position C0°. The work W is inverted its position and is thereafter clamped by the suitable chuck 167 at the surface 1c. The tailstock 12 is thereafter moved to be pressed on the work W. The tailstock 12 is retracted from the work W after the bracing device 168 is moved to a predetermined position for holding the work W.

After completion of the above preparatory operation, the tool spindle 107 is indeed to the position B0° for changing the tool by the ATC 165 to a turning tool for roughly machining the peripheral surface of the flange 4 and the end portion 5. The tool spindle 107 is thereafter indexed to the positions B90° and B0° for machining the peripheral surface of the flange 4 and the end portion 5, respectively, in the turning mode. After such rough machining operation, the tool is subsequently changed to one for finishing the peripheral surface of the flange 4 and the end portion 5, and the finishing operation is made also in the turning mode.

The finishing tool for machining the peripheral surface of the flange 4 and the end portion 5 is again changed by the ATC 165 to the tool for roughly machining the remaining inner surface 2, and the tool spindle 107 is operated in the turning mode at the position B0° to machine the inner surface 2 while the depth of cut and the feeding amount are determined through numerical control with respect to the directions of the X-axis and the Z-axis, respectively. The tool is thereafter changed to one for finishing the inner surface 2, and the finishing operation is subsequently made.

The operation for forming the threaded holes 9 of the flanged portion 4 is subsequently performed as will be hereinafter explained. Firstly, the tool for finishing the inner surface 2 is changed by the ATC 165 to a tool for forming center holes to be prepared for the threaded holes 9. For forming the center holes, the tool spindle 107 is set for the rotary cutting mode, and the headstock 11 is firstly indexed to the position C30°. The center hole at this position C30° is formed with the tool spindle 107 kept at the position B0° and fed in a direction of the Z-axis. The other center holes may be formed with the work W in turn indexed to the positions C60°, C90°, C120°, C150°, C210°, C240°, C270°, C330° by the headstock 11. The tool for forming the center holes is subsequently changed by the ATC 165 to a drill for forming prepared holes for the threaded holes 9, and the prepared holes are formed with the work W in turn indexed to the positions C30° to C330° by the headstock 11 in the same manner as the center holes. After completion of forming the prepared holes, the drill is changed by the ATC 165 at the position B0° to a tap for forming the threaded holes 9, and the threaded holes 9 are consequently formed with the work W in turn indexed to the positions C30° to C330°. With this operation for forming the threaded holes 9, the drive motor 45 may be rotated in both forward and reverse directions for reciprocal movement of the tools in the direction of the Z-axis.

After completion of forming the threaded holes 9, the tap is changed by the ATC 165 at B0° to a face milling cutter for forming the flat surfaces 8 of the flanged portion 4. The tool spindle 107 is set for the rotary cutting mode at the position B90°, and the headstock 12 is positioned at C0°. Firstly, one of the flat surfaces 8 is formed while the depth of cut and the feeding amount are determined through numerical control with respect to the directions of the X-axis and the Y-axis, respectively. The headstock 12 is subsequently indexed to the position C180° so as to form the other of the flat surfaces 8. The second step is thus completed and the robot grasps the work W so as to convey it to the work table after removal from the chuck 167 and the bracing device 168. The same operations are repeated to form the same works W.

In the above embodiment, the bracing device 168 as well as the tailstock 12 is programmable and can be automatically positioned to their set positions. Further, a plural kinds of chucks for use as the chuck 167 are set in a pallet (not shown) and can be automatically changed to each other by the robot.

With the NC lathe 10 thus constructed, the tool spindle 107 can be operated in either of the turning mode, rotary cutting mode and the right- and left-hand cutting mode. Further, the tool spindle 107 can be indexed to either of the positions B0°, B45° and B90°, and the cross slide 42 is movable with the column 21 in the direction of the Y-axis. This may provide a function as a machining center in addition to the same function as the prior art NC lathe, so that whole of the steps for machining the work W may be concentrated into two steps which may be performed by only one NC lathe. Thus, the operation for machining the work W can be made without consuming any time for transferring the work W for subsequent machining steps. Further, the number of times of set-up operations as well as the number of manhour for machining the work W can be decreased, so that the efficiency of machining of the work W can be increased. Additionally, since only two set-up operations is required for machining the work W, the error in machining the work W caused by the set-up operations may be considerably decreased, so that the precision of machining of the work W and the quality of the work W can be improved.

Figure 24:
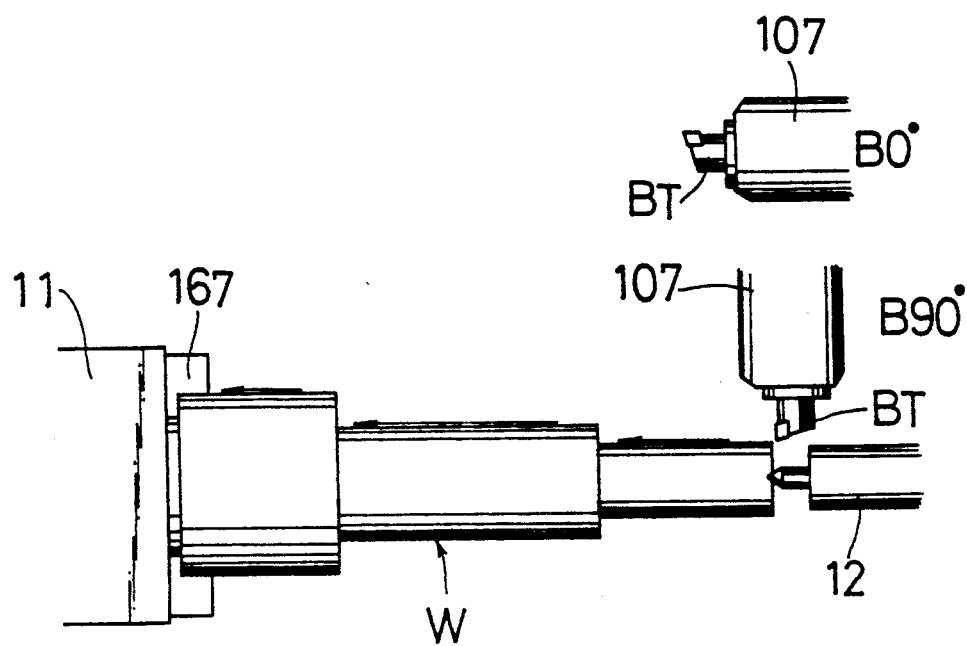
FIG. 24 is a front view of the work with the tool spindle positioned at B0° and B90° for turning the work.

Particularly for the machining operation in the turning mode, the right- and left-hand cutting mode and the rotary cutting mode, the tool spindle 107 can be positioned at either of three positions B0°, B45° and B90°. Therefore, it is not necessary to consider the direction of a tool holder as required in the prior art NC lathe. Thus, in the prior art NC lathe, it is necessary to prepare a number of tools each applied for use with various machining operations such as operations for machining the outer peripheral surface, boring and facing the end surface. With the NC lathe of the above embodiment, however, the inner surface as well as the end surface can be machined by indexing the position of the tool spindle 107 to the position B0° and the outer surface as well as the end surface can be machined by indexing the position of the tool spindle 107 to B90° as shown in FIGS. 24 and 25. Further, the depth of cut can be determined through control of the position in the direction of the Z-axis with the tool spindle 107 indexed to the position B0°. Additionally, with the tool spindle 107 indexed to the position B0°, the body of the tool spindle 107 may not be interfered to machine the stepped portion R positioned between the portions having diameters considerably different from each other as shown in FIG. 25, although the body of the tool spindle 107 may have some possibility of interference with the work W when it is positioned at B90°.

Figure 27:
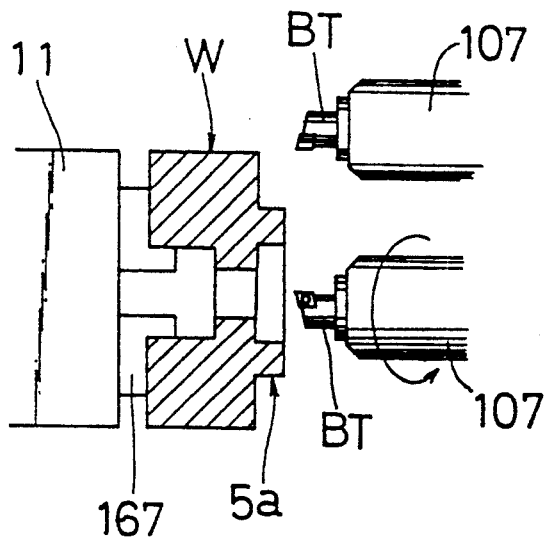

Further, with the operation of right- and left-hand cutting mode for machining a work Wa to have stepped surface 1d and 1e which are symmetrical with each other as shown in FIGS. 26 and 27, since the spindle 113 can be indexed to either of the positions 0° and 180°, the surfaces 1d and 1e can be formed by the cutting tool BT through the following steps. Firstly, the surface 1d is formed by the steps of indexing the position of the spindle 113 to 0°, indexing the position of the tool spindle 107 to B90°, driving the headstock 11 and moving the tool spindle 107 in a direction shown by an arrow in FIG. 26. The spindle 113 is thereafter positioned at 180° so as to reverse the direction of the cutting edge of the cutting tool BT. The surface 1e is subsequently formed with the headstock 11 driven in a reverse direction. Further, in case a boss portion 5a is to be formed on the end portion of the work as shown in FIG. 27, the end surface and the outer peripheral surface of the end portion are firstly machined with the tool spindle 107 and the spindle 113 indexed at positions B0° and 0°, respectively. The inner surface of the boss portion 5a is subsequently formed with the spindle 113 positioned at 180° while the head stock 11 is driven in the reverse direction.

Figure 28:
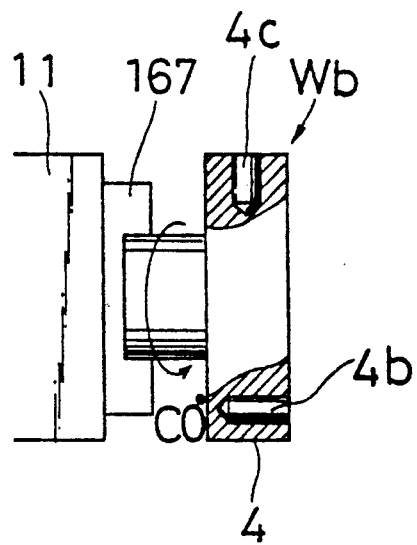
FIG. 28 is a schematic view showing drilling and tapping operations performed by the tool spindle under rotary cutting mode.

Additionally, in case that a hole 4b is to be formed on a flanged portion 4 of a work Wb as shown in FIG. 28, the lock devices 122, 131 are set to unclamp the spindle 113 so as to permit rotation of the spindle 113. The tool spindle 107 and the headstock 11 are indexed to the positions B90° and C0°, respectively. The position of the tool is determined under control with respect to the directions of the X-axis and the Y-axis, and fed in the direction of the X-axis to form the hole 4a. In case the hole 4b is to be formed in a plural number, the positions of the holes 4b are indexed by the headstock 11. Further, if the hole 4b is a threaded hole, a prepared hole is firstly formed in the same manner as described above and is thereafter threaded by a tap. This operation is performed with the headstock 11 driven in the forward direction and in the reverse direction. Additionally, in case a hole 4c is to be formed on the end surface, the tool spindle 107 is indexed to the position B0°, and the tool is fed in the direction of the Z-axis.

Figure 29:
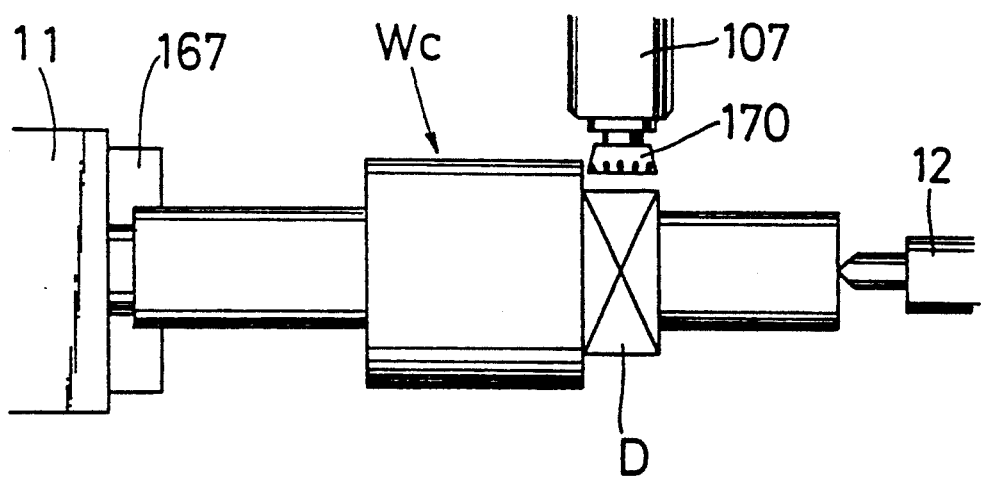
FIGS. 29 and 30 are schematic views showing different milling operations by the tool spindle under the rotary cutting mode.

Meanwhile, in case of a face milling operation under rotary cutting mode such as an operation to machine a work Wc to have a square shaft portion D as shown in FIG. 29, such operation may include the steps of changing the tool to a face milling cutter 170, indexing the position of the tool spindle 107 to the position B90°, indexing the position of the headstock 11 to C0°, positioning the face milling cutter 170 with respect to the directions of X-axis and Z-axis, and feeding the tool spindle 107 in the direction of Y-axis. One side of the shaft portion D at the position C0° is thus formed and the same operations are performed with the headstock 11 in turn indexed to the positions C90°, C180° and C270° so as to form the other sides of the shaft portion D.

Figure 30:
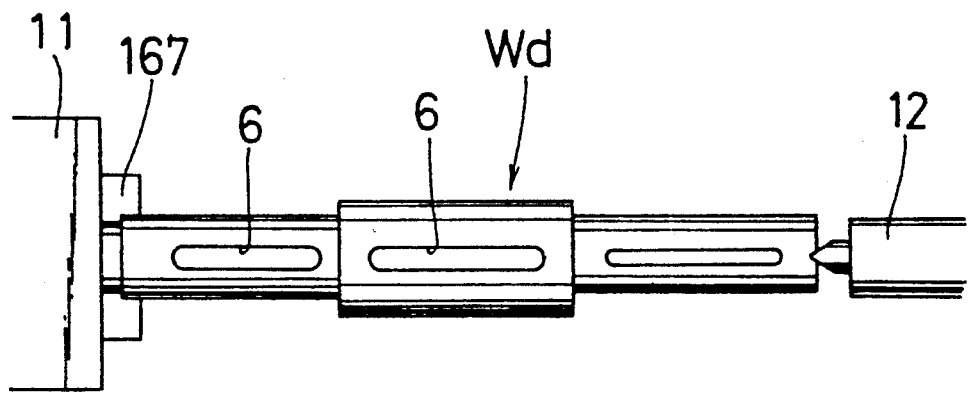

In case of forming different key recesses 6 in a work Wd as shown in FIG. 30 by the face milling operation under the rotary cutting mode, the width of each of the recesses 6 may be precisely formed base on the control of the position with respect to the direction of the Y-axis. Thus, with the above embodiment, because of the control of the position with respect to the Y-axis, the precision of the width of the key recesses 6 does not depend on the precision of the face milling cutter itself as is the case with the prior art NC lathe.

Consequently, with the above embodiment, the order of machining operations in each of the machining modes can be easily set for combination of different machining operations. Further, the number of kinds of the cutting tool or the turning tool to be used may be minimized. Additionally, a multiple-surface machining can be made.

While the invention has been described with reference to a preferred embodiment thereof, it is to be understood that modifications or variations may be easily made without departing from the scope of the present invention which is defined by the appended claims.

What is claimed is:

1. A carriage structure of an NC lathe comprising a bed, a headstock mounted on said bed for rotating a work around C-axis, a tailstock slidably mounted on a first guide surface formed on said bed, and a carriage slidably mounted on a second guide surface formed on said bed in a direction of Z-axis parallel to said C-axis and juxtaposed with said first guide surface, said carriage including:

a saddle having a first slide surface for contacting said second guide surface of said bed and a second slide surface inclined at a predetermined angle with respect to said first slide surface;

a slide base slidably mounted on the second slide surface of said saddle for movement in a direction of Y-axis perpendicular to the Z-axis;

a column extending from said slide base substantially perpendicular thereto and having a column body which includes a guide surface in a direction of X-axis perpendicular to the Z-axis and to the Y-axis;

a cross slide slidably mounted on said guide surface of said column body in the direction of the X-axis;

a tool spindle rotatably mounted on said cross slide around B-axis perpendicular to the X-axis and to the Z-axis;

a spindle rotatably supported by said tool spindle around an axis perpendicular to the B-axis for mounting a cutting tool thereon;

said cross slide including a drive shaft and a rotary shaft for rotating said spindle and said tool spindle, respectively, said drive shaft and said rotary shaft being rotatably mounted on said cross slide, and said cross slide further including a driving device for driving said drive shaft and said rotary shaft;

said drive shaft and said rotary shaft being coaxially disposed with each other and rotatably around the B-axis, said driving device including a first driving device for rotating said drive shaft and a second driving device for rotating said rotary shaft, and said second driving device being operable to index the position of said tool spindle around the B-axis;

said tool spindle includes a lock device for fixing the position of said spindle relative to said tool spindle; and said lock device being operable to selectively fix the position of said spindle at two positions between 0° and 180° around an axis of said spindle where a cutting edge of the cutting tool is directed to opposite directions, so that said tool spindle can be operated in a turning mode with said spindle fixed to the position 0° and can be operated in a rotary cutting mode with said spindle permitted to rotate, and can be operated in a right- and left-hand cutting mode with said spindle fixed to either of the two positions between 0° and 180°.

2. The carriage structure as defined in claim 1 wherein a coupling device is provided for fixing the position of said rotary shaft relative to said cross slide.

3. The carriage structure as defined in claim 1 wherein said lock device includes a lock rod; said spindle includes a pair of recesses formed on said spindle at the positions between 0° and 180°, respectively; and said lock rod is movable to engage either of said recesses.

4. The carriage structure as defined in claim 1 wherein said second driving device is operable to index the position of said tool spindle to any of three positions B0°, B45° and B90° within a range of 90°.

* * * * *